Dec. 7, 1948.  O. A. LIGHT  2,455,507
STORAGE RACK
Filed Feb. 21, 1945   20 Sheets-Sheet 3

INVENTOR
OLIVER A. LIGHT.
BY
Howard P. King
ATTORNEY

Dec. 7, 1948.  O. A. LIGHT  2,455,507
STORAGE RACK

Filed Feb. 21, 1945  20 Sheets-Sheet 4

INVENTOR
OLIVER A. LIGHT.
BY
Howard P. King
ATTORNEY

Dec. 7, 1948. O. A. LIGHT 2,455,507
STORAGE RACK
Filed Feb. 21, 1945 20 Sheets-Sheet 5
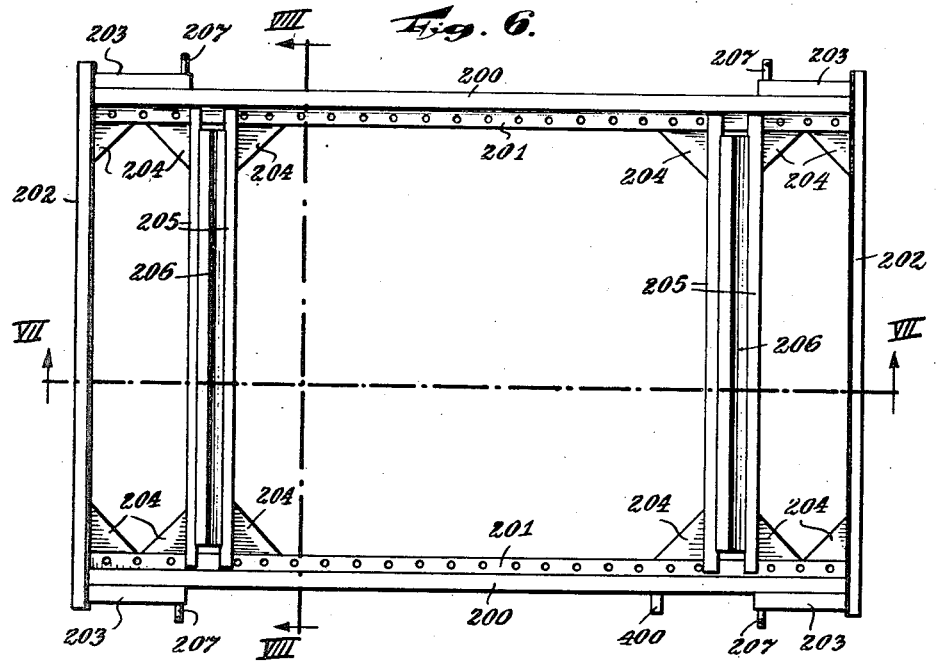
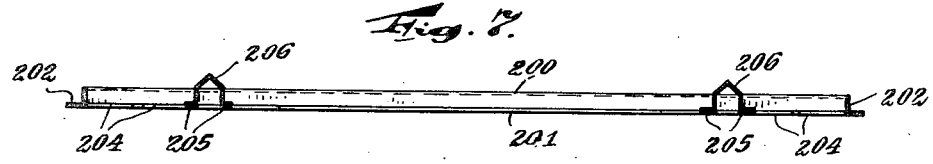
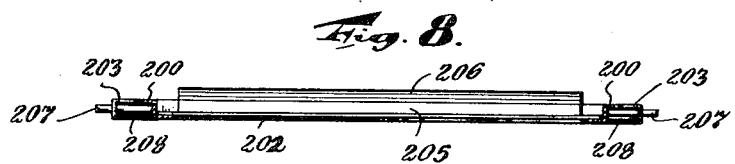
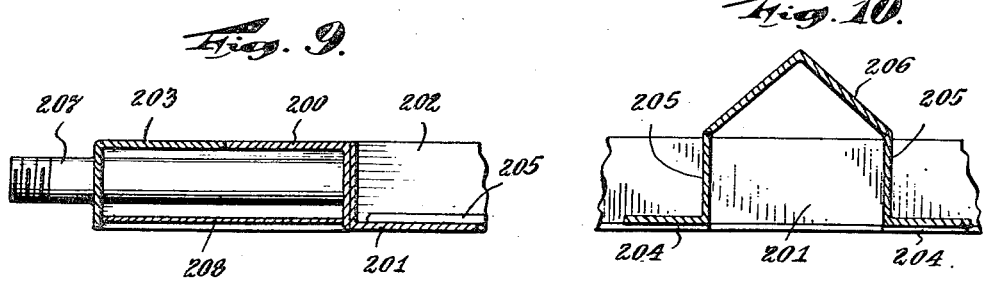
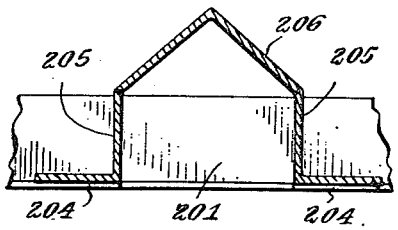
INVENTOR
OLIVER A. LIGHT
BY
Howard P. King
ATTORNEY Dec. 7, 1948.  O. A. LIGHT  2,455,507
STORAGE RACK
Filed Feb. 21, 1945   20 Sheets-Sheet 6
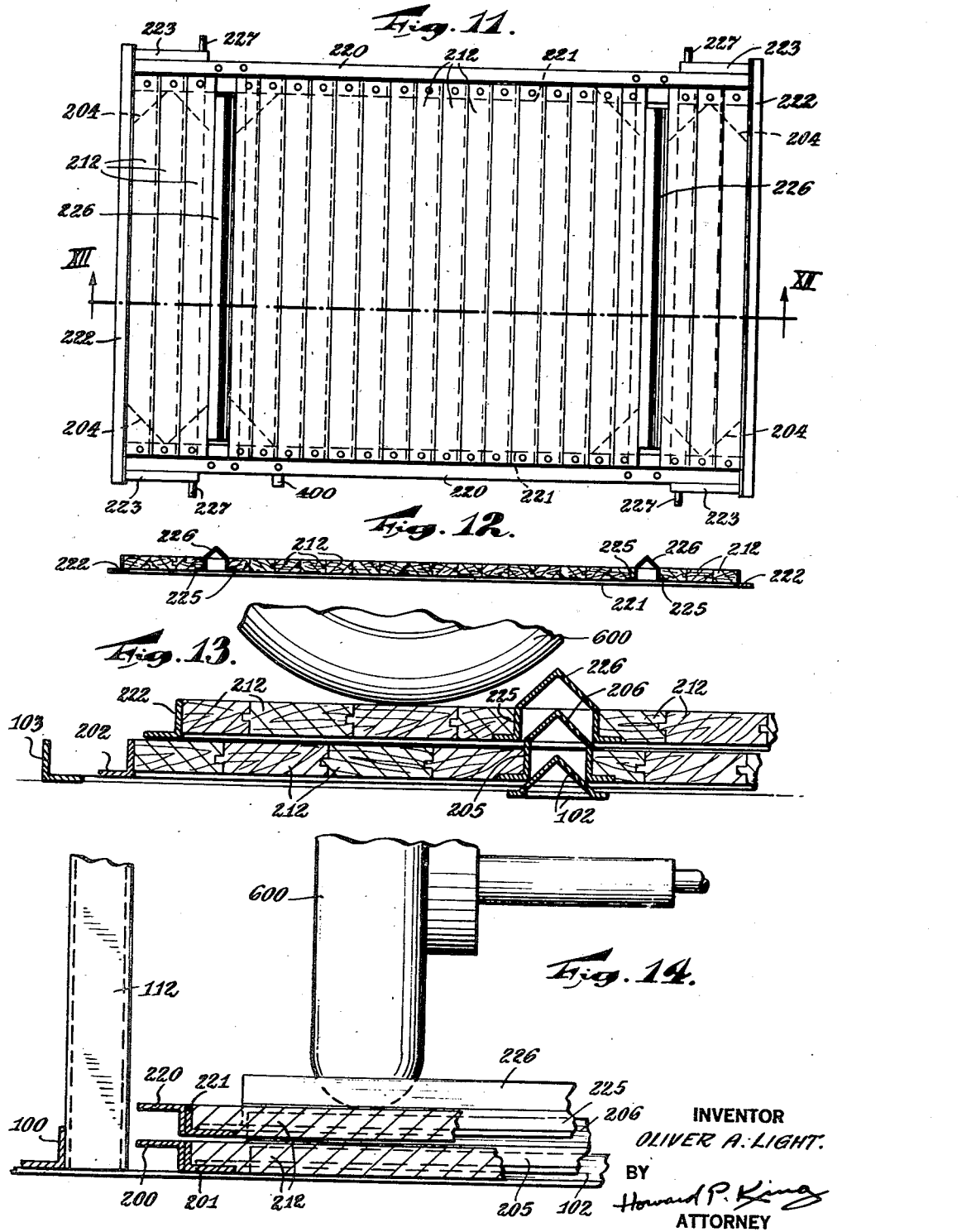

Dec. 7, 1948.  O. A. LIGHT  2,455,507
STORAGE RACK

Filed Feb. 21, 1945  20 Sheets-Sheet 7

INVENTOR
OLIVER A. LIGHT.
BY
Howard P. King
ATTORNEY

Dec. 7, 1948.    O. A. LIGHT    2,455,507
STORAGE RACK
Filed Feb. 21, 1945    20 Sheets-Sheet 8
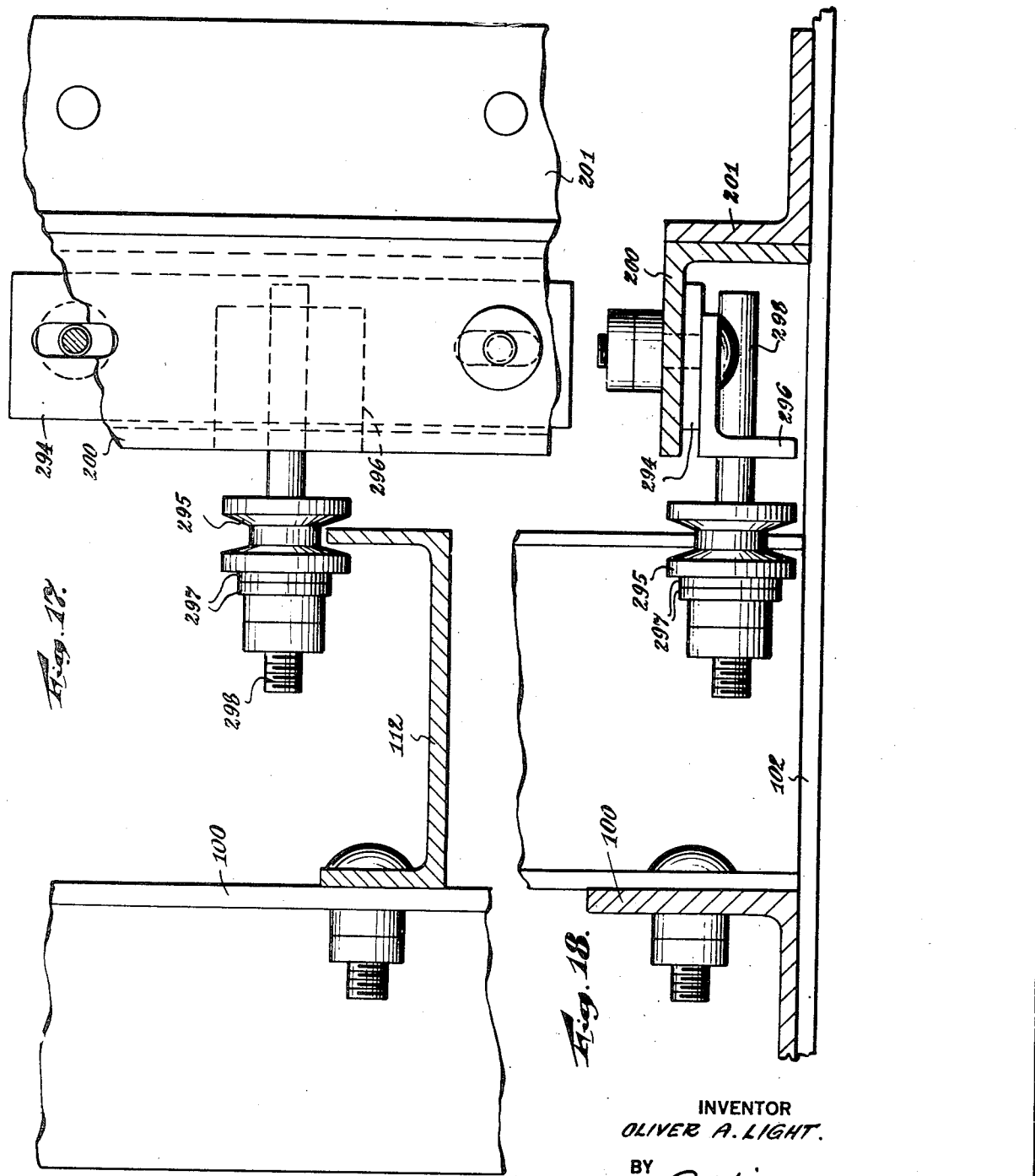
INVENTOR
OLIVER A. LIGHT.
BY
Howard P. King
ATTORNEY Dec. 7, 1948.  O. A. LIGHT  2,455,507
STORAGE RACK
Filed Feb. 21, 1945  20 Sheets-Sheet 9
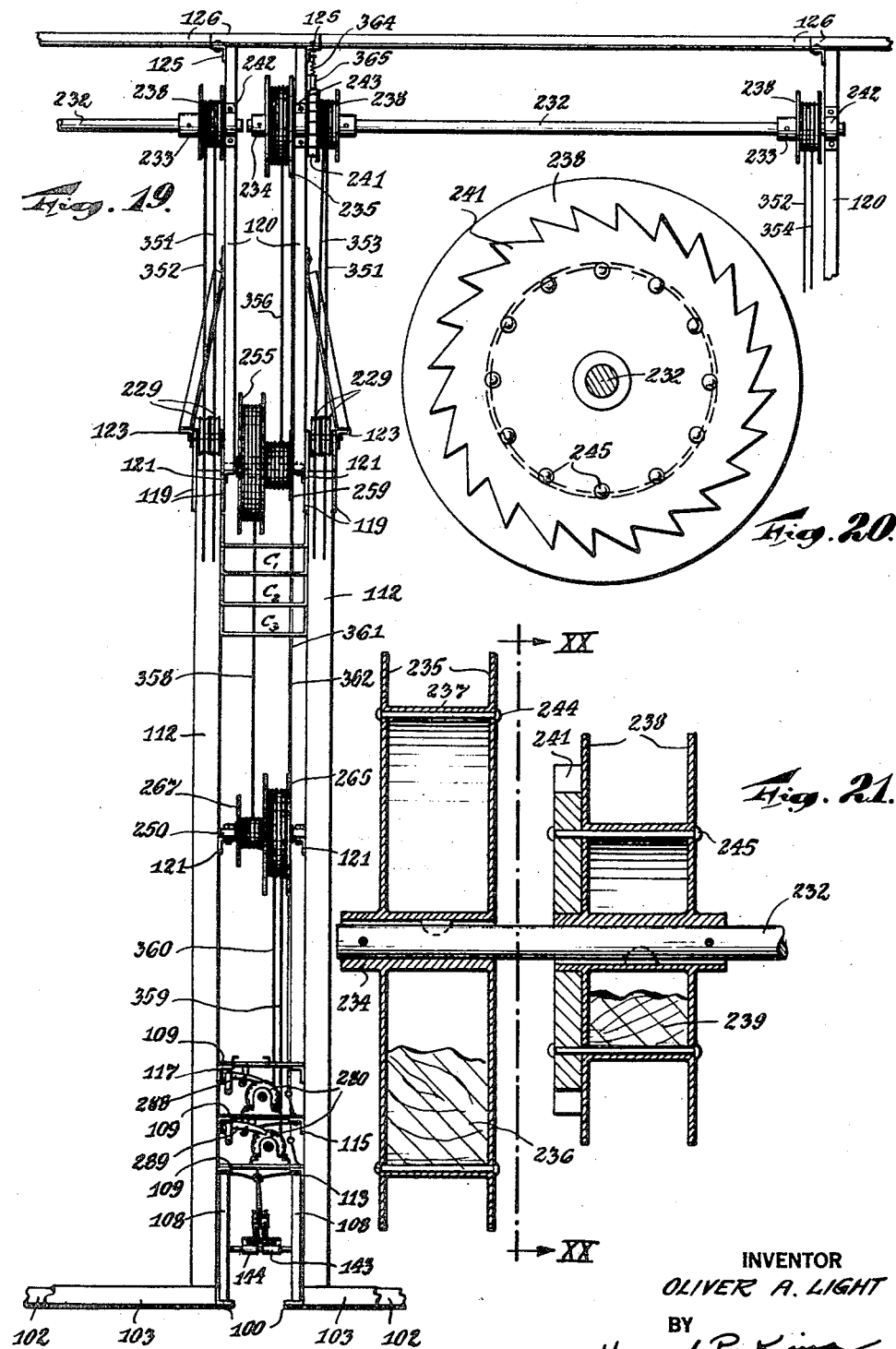
INVENTOR
OLIVER A. LIGHT
BY
Howard P. King
ATTORNEY Dec. 7, 1948.  O. A. LIGHT  2,455,507
STORAGE RACK
Filed Feb. 21, 1945  20 Sheets-Sheet 10
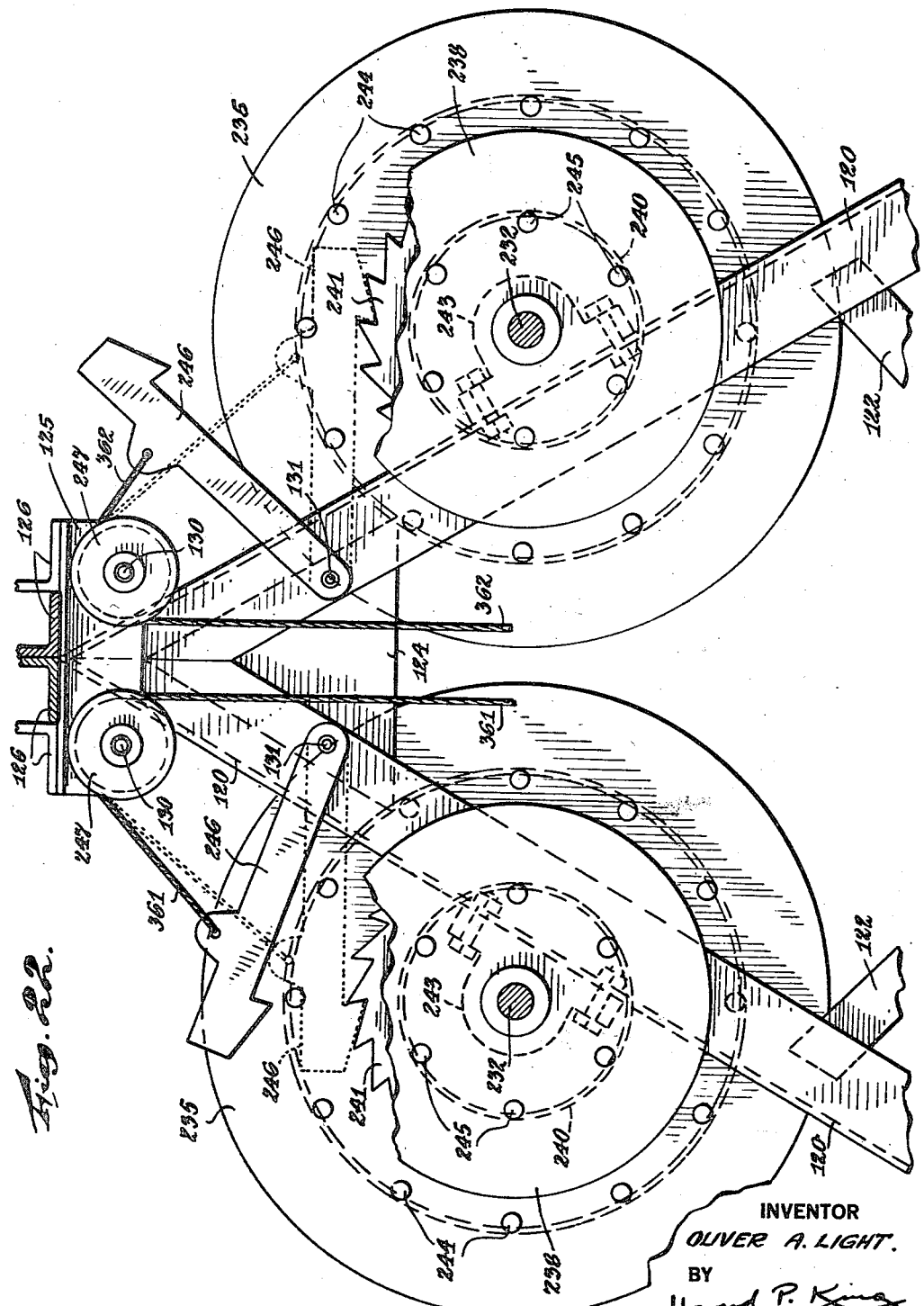
INVENTOR
OLIVER A. LIGHT.
BY
Howard P. King
ATTORNEY

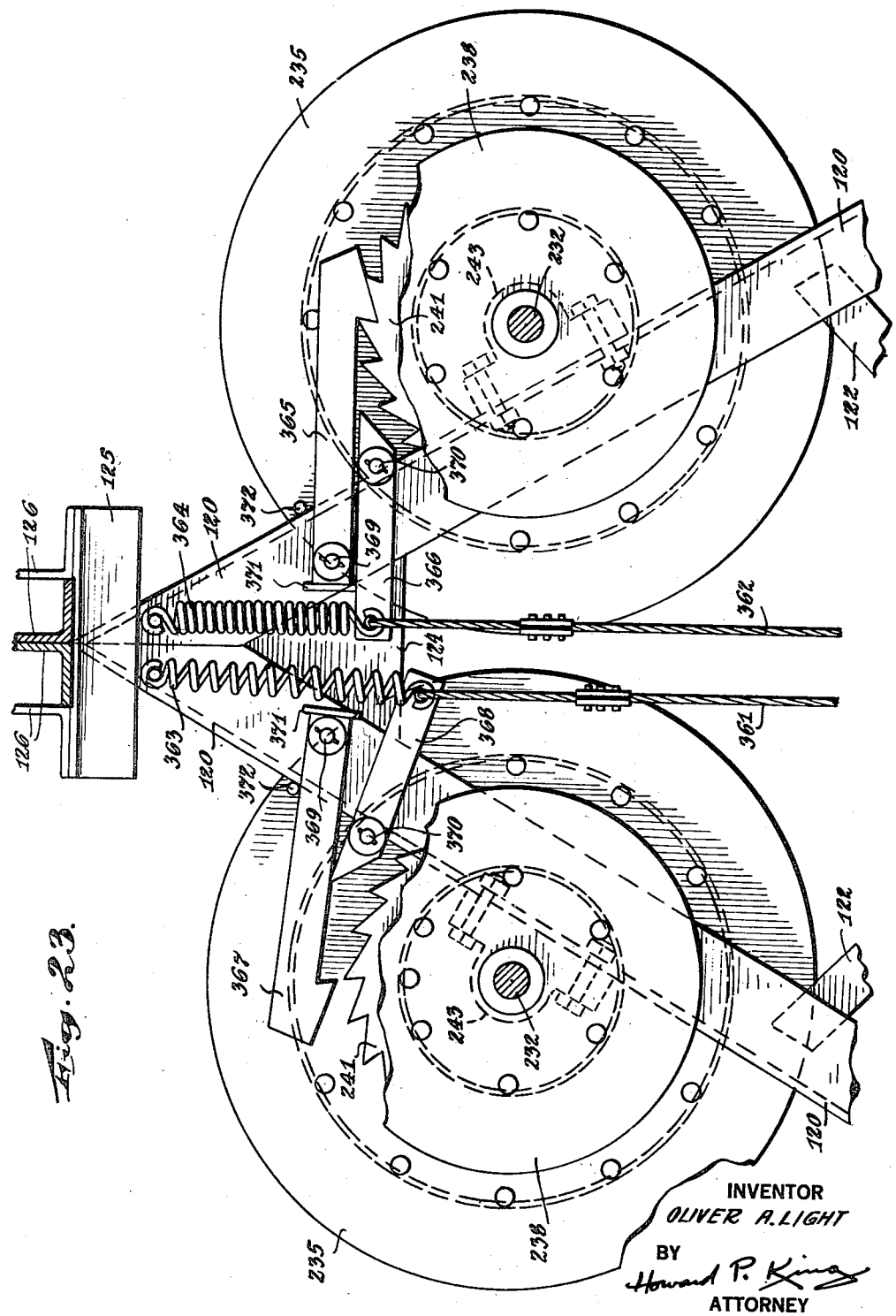

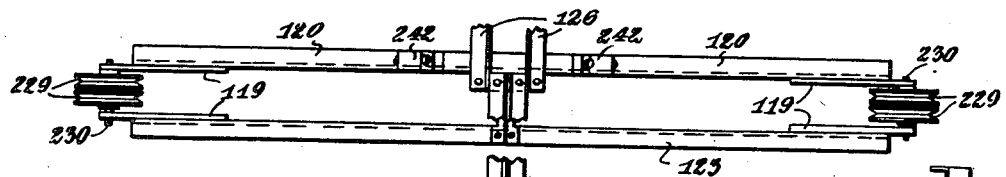
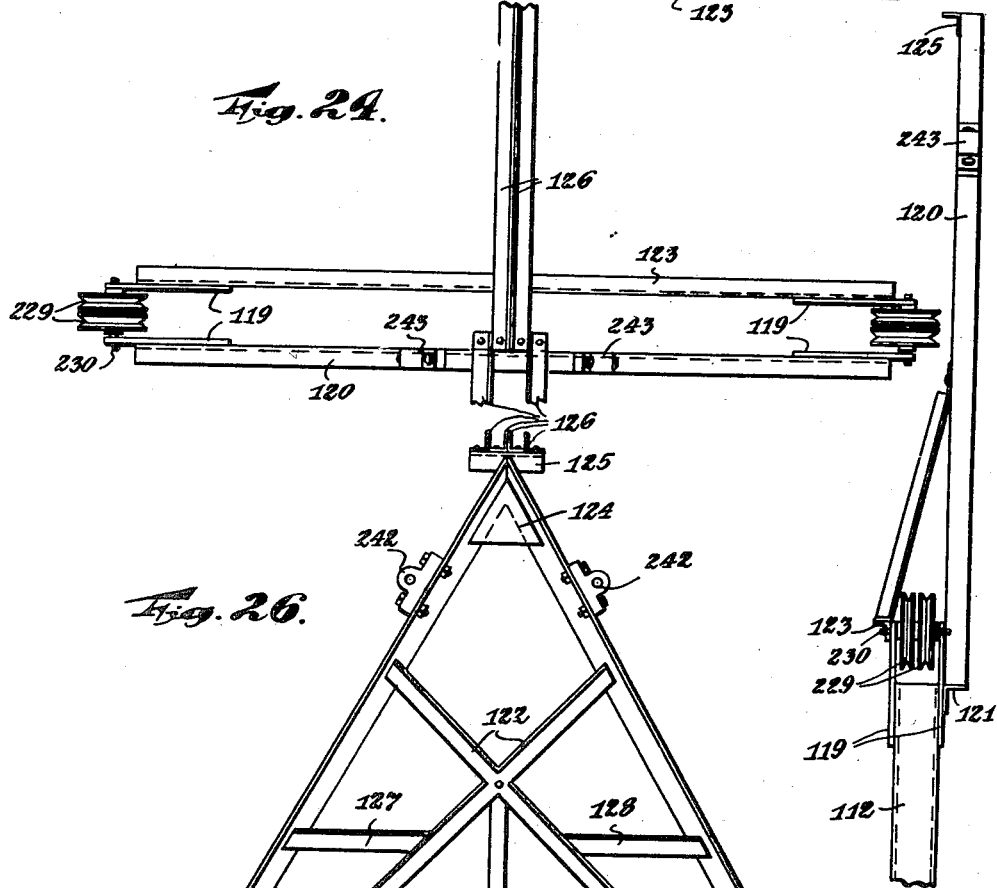
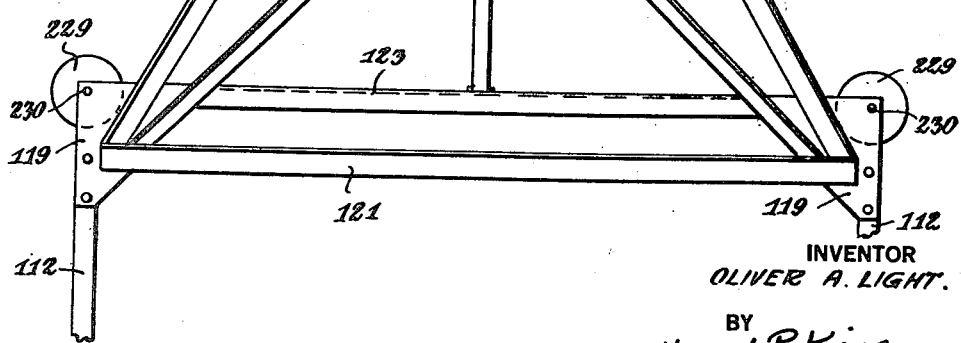

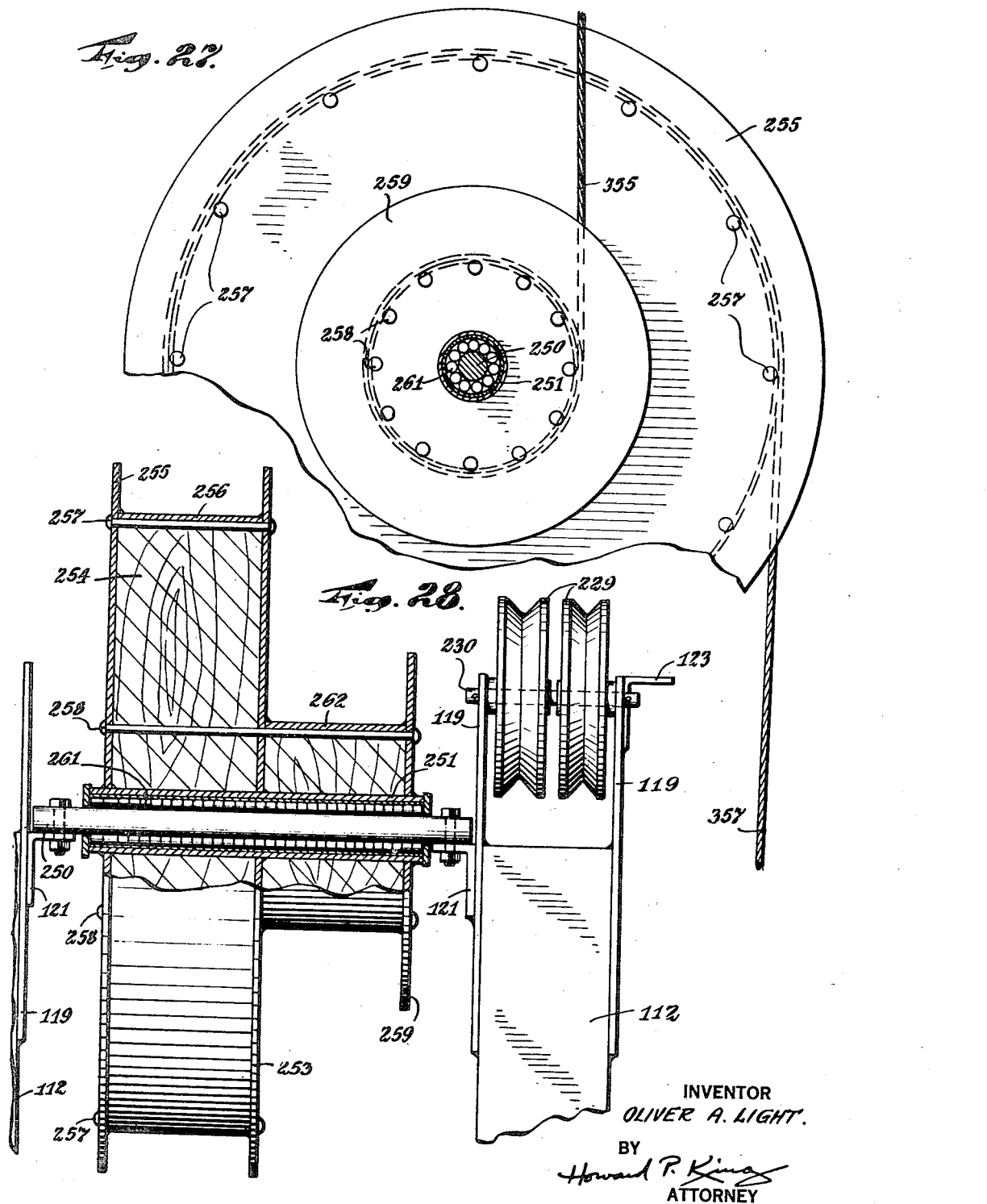

Dec. 7, 1948.  O. A. LIGHT  2,455,507
STORAGE RACK
Filed Feb. 21, 1945  20 Sheets-Sheet 14
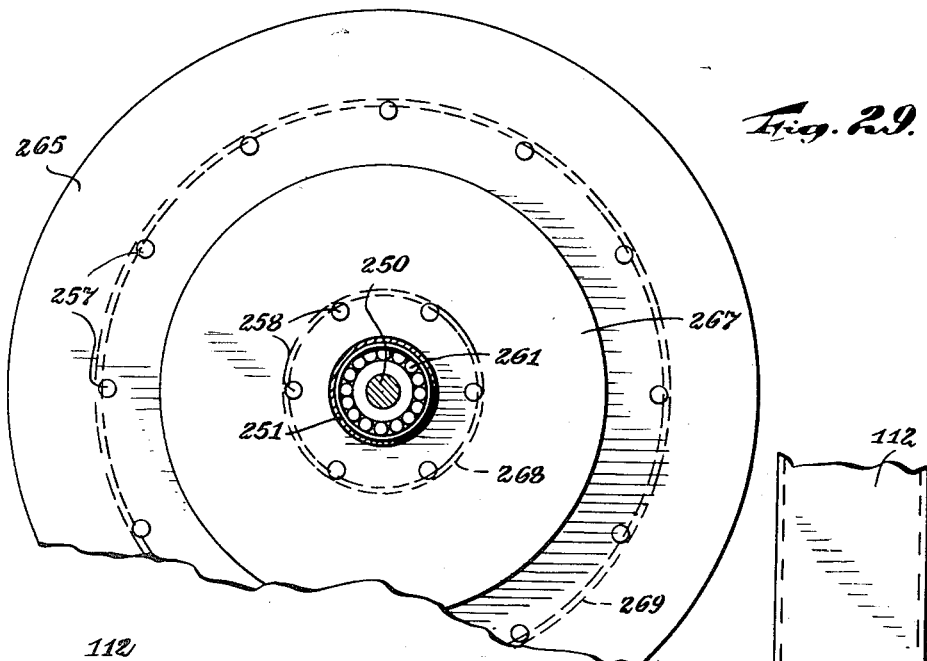
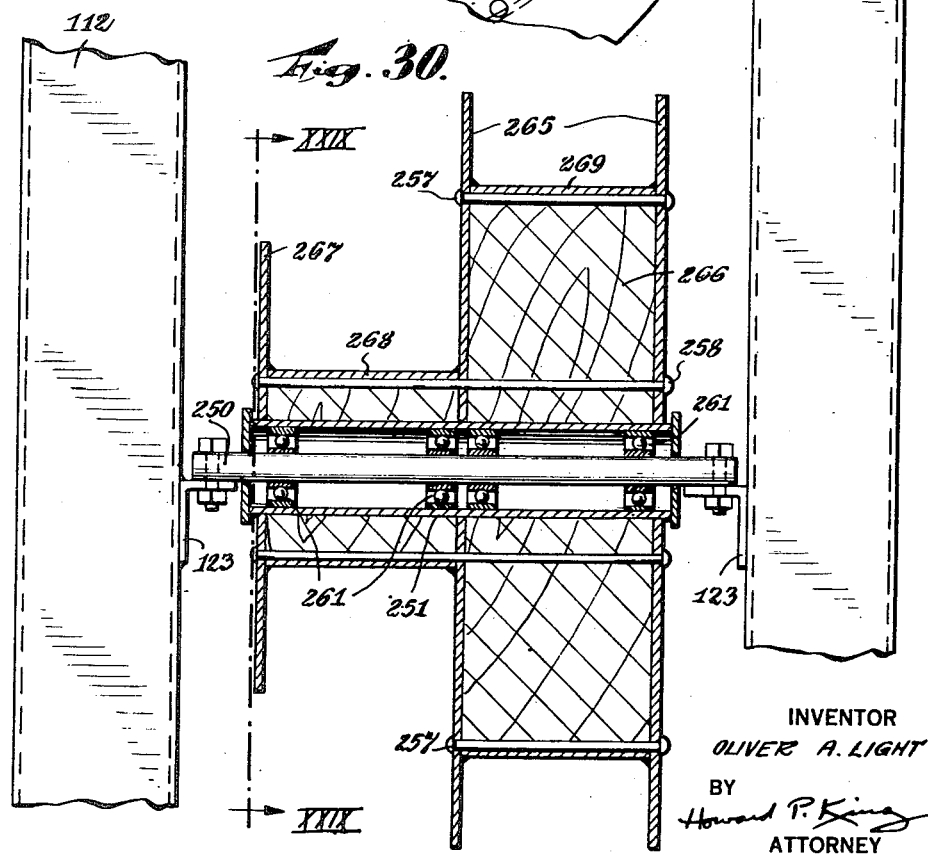
INVENTOR
OLIVER A. LIGHT.
BY
Howard P. King
ATTORNEY

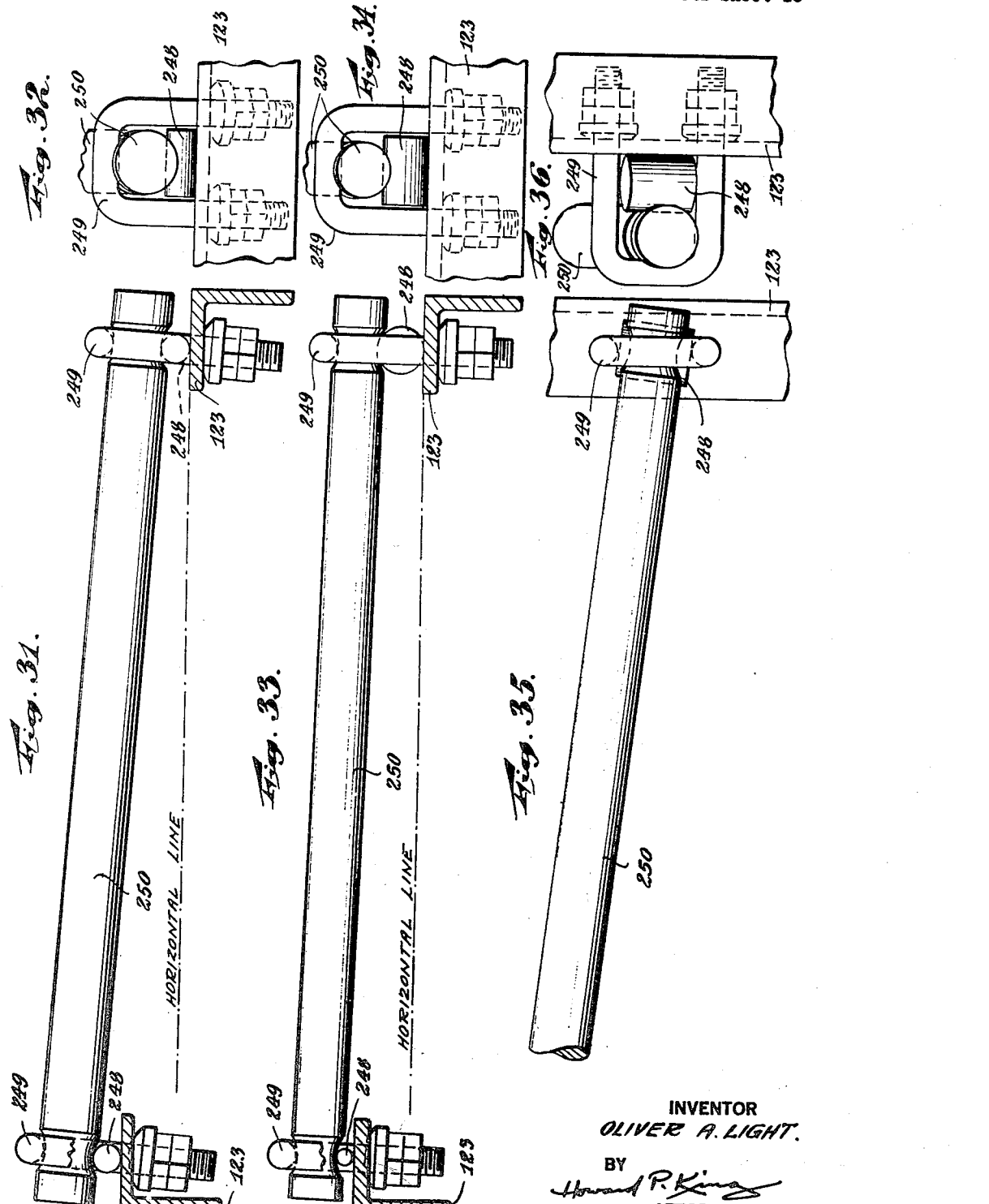

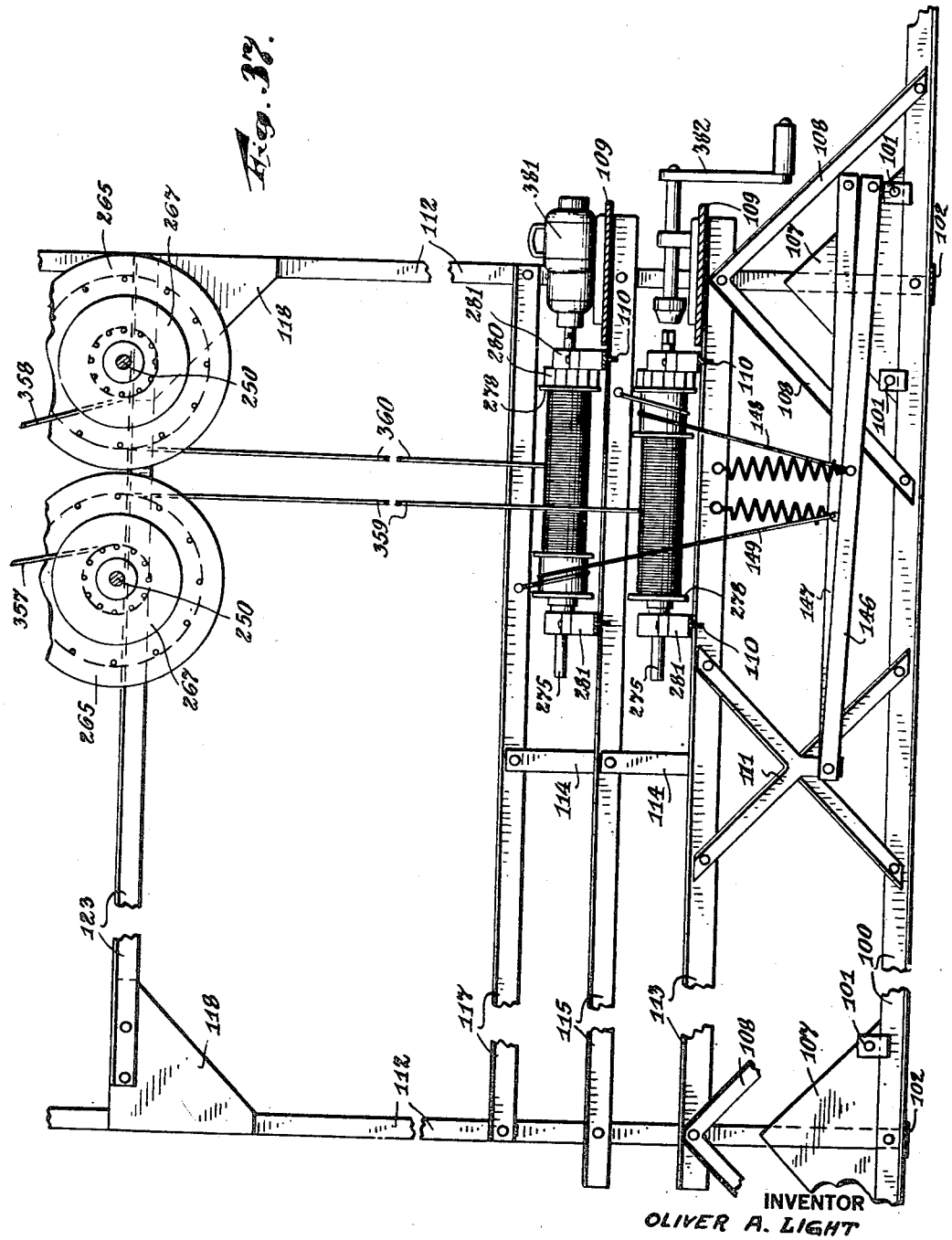

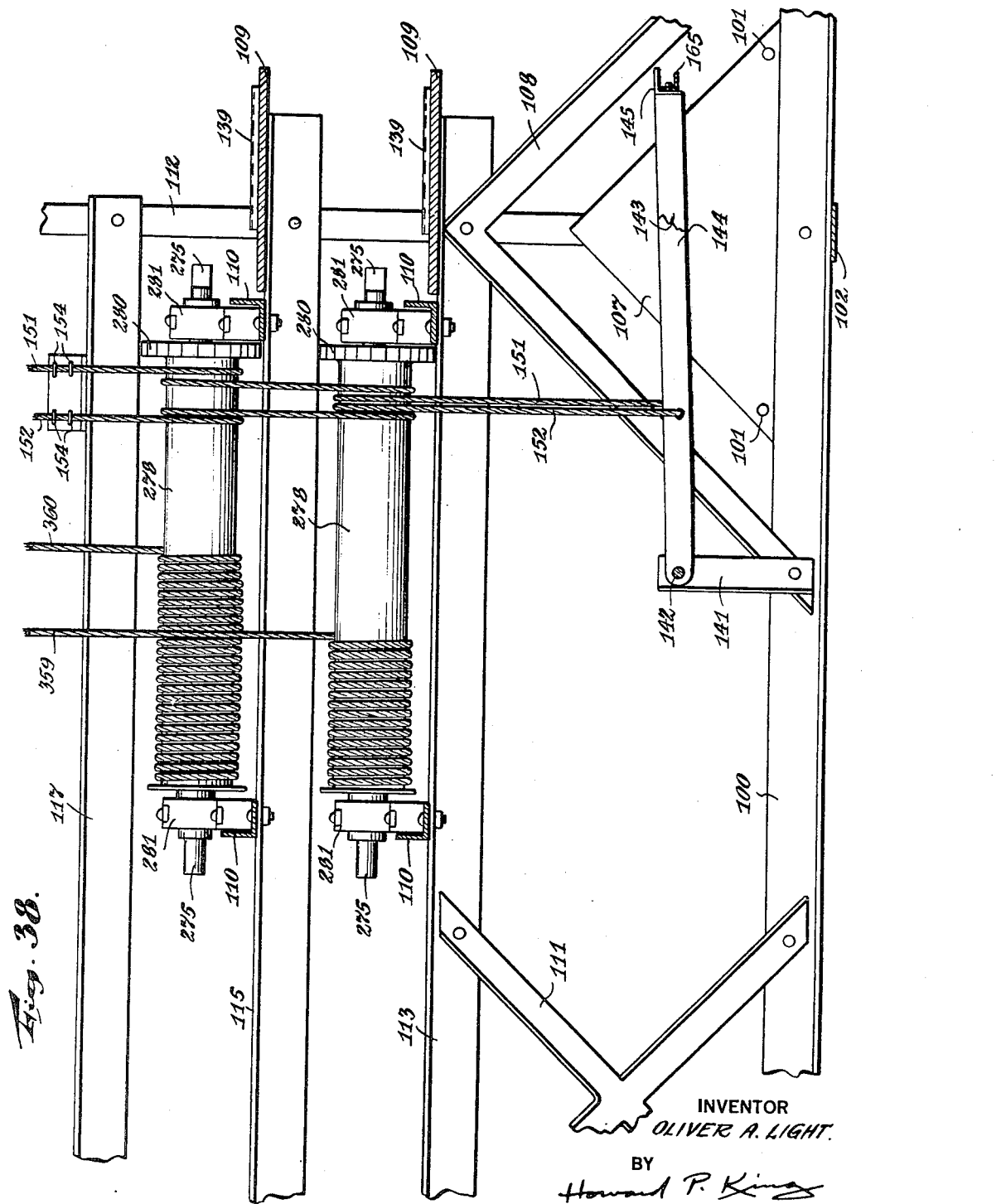

Dec. 7, 1948.   O. A. LIGHT   2,455,507
STORAGE RACK
Filed Feb. 21, 1945   20 Sheets-Sheet 18

INVENTOR
OLIVER A. LIGHT
BY
Howard P. King
ATTORNEY

Dec. 7, 1948.    O. A. LIGHT    2,455,507
STORAGE RACK

Filed Feb. 21, 1945    20 Sheets-Sheet 20

INVENTOR
OLIVER A. LIGHT.
BY
Howard P. King
ATTORNEY

Patented Dec. 7, 1948

2,455,507

UNITED STATES PATENT OFFICE 2,455,507

STORAGE RACK

Oliver A. Light, East Orange, N. J.

Application February 21, 1945, Serial No. 578,982

15 Claims. (Cl. 254—144)

1

This invention relates to storage racks, having adaptability to storage of various items such as vehicles, boats and various articles of merchandise, and having utility in parking lots, on or in buildings, or elsewhere. The invention here disclosed is an improvement upon my prior Patents 2,242,891 and 2,242,892 of May 20, 1941.

The objects of the invention are to provide an improved, effective storage rack for increasing the effective storage capacity of any given area; to provide a storage rack which is self-sustaining and adaptable to being set up readily at a selected place; to provide for adequate bracing for adapting the structure to use in open areas with minimum necessity for foundation or other preparatory construction; to conserve space and material and increase storage capacity for a given area to a desired maximum; to adjust and maintain the storage platforms in level position and guided against lateral displacements; to simplify the elevating and lowering mechanisms; to enable the elevating operation to be accomplished by a motor; to utilize a portable motor for any platform chosen to be operated and provide for the motor to be applied in place with respect to any chosen platform; to automatically stop the motor when the operated platform reaches a predetermined uppermost position; to provide motor and electric current contacts which are rainproof and sheltered; to provide a safety ratchet and pawl on lifting shafts at the top of the rack units; to provide a second safety ratchet and pawl for the power shaft in connection with the lifting mechanism for each platform; to provide a lock on the pawls associated with the power shaft; to provide a lock on the motor for retaining the motor in operating position; to provide an on-and-off switch on the motors; to associate the retarding brakes and pawl release in such relation that the operator will naturally use the right brake or both brakes with the release of said pawls; to provide a compound lever pawl so said pawls can be released without having to first relieve tension on the ratchet; to enable hand cranks to be substituted for the platform-elevating motor; to provide double acting brakes on the power shaft drums for taking advantage of rotation of said drums to tend to tighten the brakes; to provide two of said double acting brakes to operate in unison when two platforms are lowered in unison; to provide for elevating platforms in unison or separately; to secure simplicity of construction and operation; and to obtain other advantages and

2 results as may be brought out in the following description.

Referring to the accompanying drawings in which like numerals of reference indicate similar parts throughout the several views:

Figure 6 is a plan of the lower platform frame;

Figure 7 is a side elevation of Fig. 6 with the near side rail omitted for illustrating structure behind the same;

Figure 8 is an end elevation of Fig. 6 likewise with the near end rail omitted;

Figure 9 is an end elevation on larger scale of a portion shown at the left of Fig. 8 to show the shaft to which the lifting wire ropes are attached;

Figure 10 is an end elevation of one of the girders of Figs. 6, 7 and 8 and with the side rail indicated in dotted lines for showing the relation of said girder to the side rail;

Figure 11 is a plan of the upper platform showing its fire-proofed floor boards in position;

Figure 12 is a side elevation of Fig. 11, but again with the side rail omitted for clarity;

Figure 13 is a side elevation with the side rails omitted for clarity, showing the upper platform nesting on the lower platform and it in turn nesting on the base frame;

Figure 14 is an elevation of a portion of the two platforms near a vertical post;

Figure 17 is a plan of an adjustable guide roller in its position relative to a corner portion of a platform, and shown in associated relation to one of the flanges of one of the upright posts.

Figure 18 is an end elevation of Fig. 17;

Figure 19 is an elevation of one intermediate chassis and corresponding elevation of the top driven shaft showing the safety ratchet and the three wire-rope drums on said top shaft;

Figure 20 is a side elevation of the safety ratchet mounted upon the side of its associated drum;

Figure 21 is a sectional elevation of a portion of a top driven shaft as shown in but on larger scale than in Fig. 19;

Figure 22 is a side elevation of the top portion of one rafter assembly showing one construction and means for operating pawls of the safety ratchets;

Figure 23 is a side elevation of a portion of said rafter assembly and the preferred compound lever pawls to release the safety ratchet on said top driven shaft;

Figure 24 is a plan of one of the rafter assemblies;

Figure 25 is an elevation thereof and showing it attached to the supporting frame;

Figure 26 is a side elevation of Fig. 25;

Figure 27 is a side elevation of one of the power increasing wire-rope drums;

Figure 28 is a sectional elevation showing the stationary shaft on which the wire-rope drum revolves and parts immediately associated therewith;

Figure 29 is a side elevation of a second wire-rope or intermediate power-increasing drum that winds and unwinds the ropes to the power shaft drum.

Figure 30 is a sectional elevation showing the wood filler forms around which is fabricated the sheet metal drums and showing the mounting for the drum;

Figures 31 and 33 are side elevations, Figure 35 is a plan, and Figures 32, 34 and 36 are end elevations of a self-aligning stationary shaft for intermediate wire rope power-increasing drums;

Figure 37 is a side elevation of the lower portion of one rack unit showing one portable motor in position on the upper power shaft and a hand-crank shown in connection with the lower power shaft, and also showing a simple brake assembly;

Figure 38 is a side elevation of said lower portion of the rack unit of Fig. 37, looking at the same from a central vertical plane within the chassis and showing the preferred two double brake construction;

Figure 40:
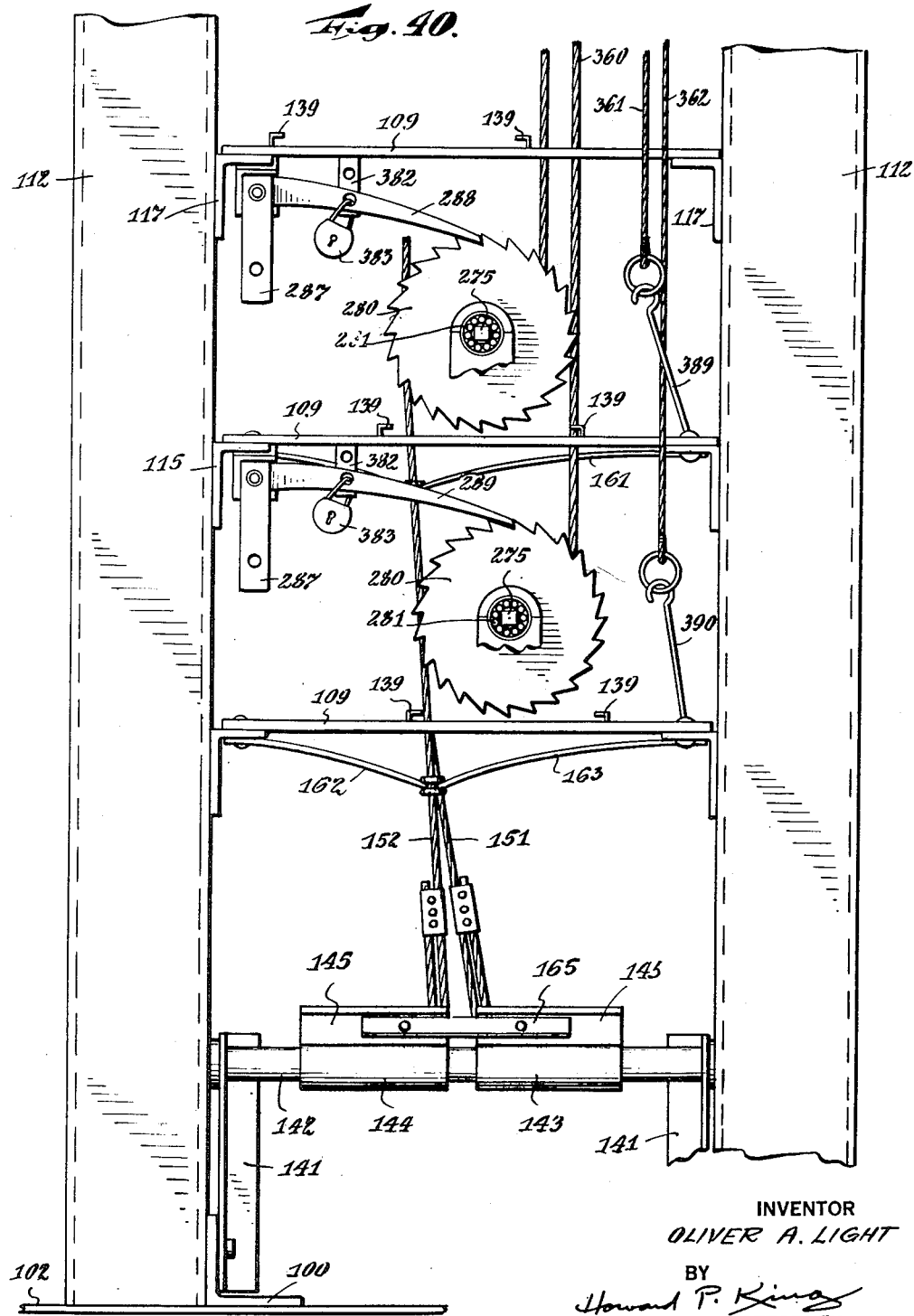
Figure 41:
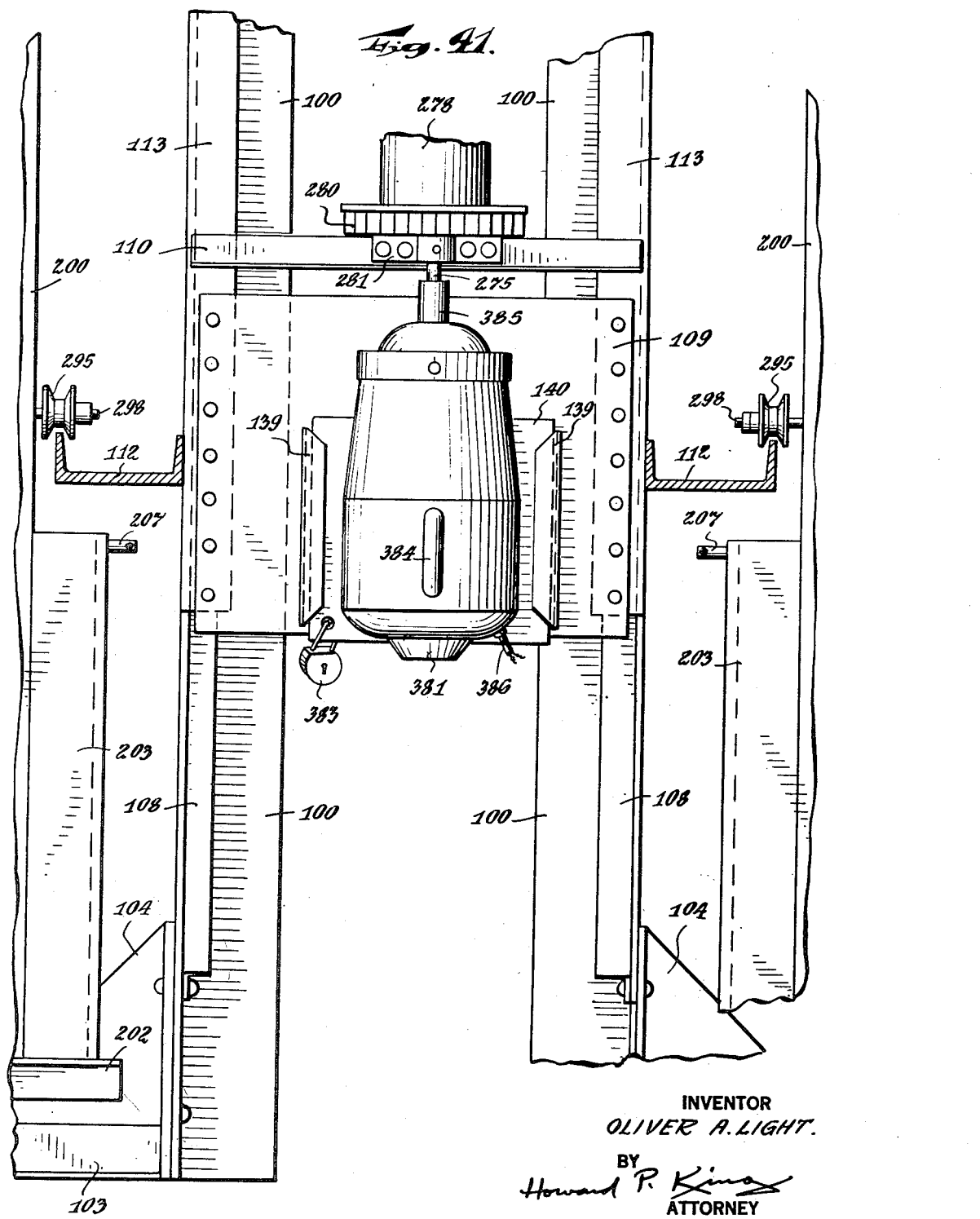

Figure 40 is an end elevation of the lower portion between the posts of the chassis, showing the lower safety ratchets with the pawls locked on the ratchets, and also showing pull ropes to operate the compound lever pawls on the safety ratchets on the top driven shaft; and Figure 41 is a plan of the motor bed plate on the lower portion of the chassis and showing a motor slid into guides of said bed plate and locked in its operative position.

In the specific embodiment of the invention illustrated in said drawings, and giving attention initially to Figures 1 to 5 inclusive, a storage rack is shown composed of a plurality of units situated side by side for reception of items to be stored, such as automobiles, boats and other merchandise. An initial one of these units (shown at the right of Fig. 1) is self sustaining and will, when individually referred to herein, be distinguished by the designation of master unit. The successive units are secured one to the master unit and then each successive unit to the next one toward the master unit.

Figure 1:
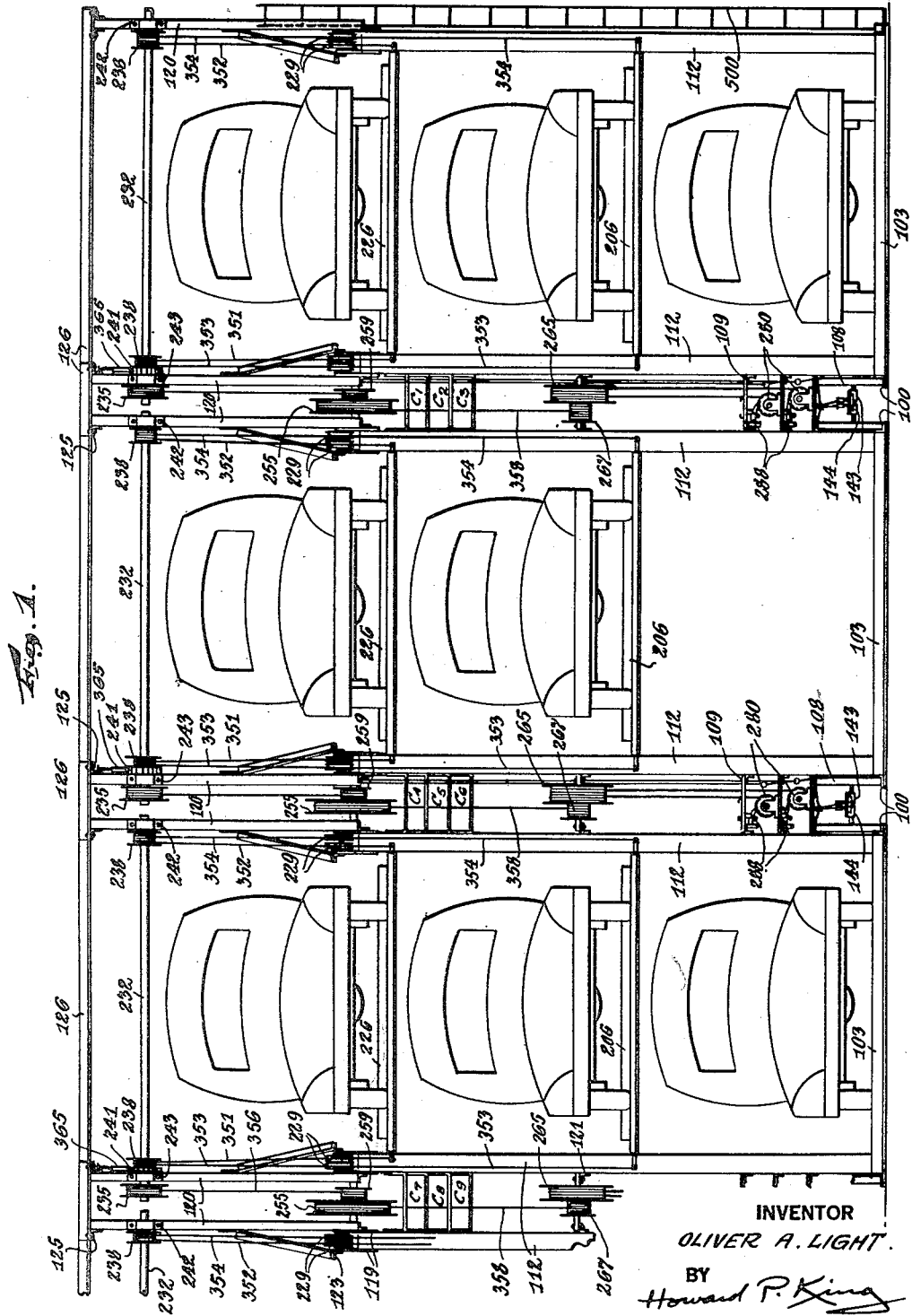
Figure 1 is an end elevation of a series of substantially duplicate or similar rack sections constructed in accordance with one embodiment of my invention.

As viewed in Figure 1, the master unit is composed of a frame at the right side thereof, more fully described and referred to as the master frame herein below, and at the left side has an upright chassis, which, as will more fully appear as the description proceeds, consists generally of two upright frames with interposed connections, motor supports and braces. Therefore, when a second unit is added, as shown, the second unit does not have a frame of its own at the right, but depends upon the chassis of the first unit for support. The second unit has a chassis at its left side, and if, as indicated in the drawing, a third unit is added, it is a duplicate of the second and relies upon the chassis at the left of the second for support of the right side of the third unit. This construction is repeated for each unit, the last of the series ending with the chassis or double frame at its left.

Each unit, whether master unit or one of the successive units, may be considered in a vertical direction as fabricated in sections, namely, a base section and a rafter section at a distance thereabove, with an intermediate section or intermediate sections successively above the base section and below the rafter section. As here shown, the assembly provides a single intermediate section and consequently each unit accommodates three vehicles, or other items, for storage, one in the base section, one in the intermediate section, and one in the rafter section. Elevator platforms are provided for support of the items stored in the intermediate and rafter sections.

The base section of the master unit comprises side sills 100 preferably at substantially ground level and horizontally disposed from front to back of the unit, said side sills being connected by end sills 103 forming therewith a horizontal rectangular frame. Flat plates 105 are welded or otherwise secured to stand in vertical planes at the ends of and transverse to the end sills and constitute convenient means for bolting or otherwise securing the said end sills to the side sills. Likewise where the end sills meet the side sills vertically disposed triangular plates or brackets are provided secured by suitable means 101 to the side sills and having vertical posts 112 attached by welding or otherwise thereto. Above the side sill 100 parallel thereto and spaced therefrom and from each other are horizontal frame members or rails 113, 115 and 117. Diagonal braces 108 and 111 are shown interposed between the lower one 113 of said frame members and the side sill, and other vertical braces 114 are shown between the several horizontal frame members.

In fabrication of the rack for any desired number of vertical sections, the upright posts 112 may be each continuous from the ground or base sill to the top of the uppermost intermediate section; and since only one intermediate section is employed in the arbitrary showing here made, the upright posts 112 accordingly extend from the base sill to the top of the intermediate section shown, thereby being of a height for two sections. Approximately midway of the height of the said posts of this particular showing, is another horizontal frame member or rail 123 functioning as the upper frame member for the base section and as the lower frame member for the intermediate section, and for convenience of reference, will be termed an upper sill member. A similar upper sill member 123 is provided at the top of the intermediate section and in this instance is at the top of the said posts. These upper sill members are braced to the posts by triangular plates 118 and 119 respectively.

The rafter section may be separately fabricated and thereafter secured to the uppermost intermediate section. As shown, the rafter section comprises a horizontal lower rail 121 from the ends of which, sloping inwardly upward to a central peak, are sloping rails or rafters 120 adequately braced by criss-crossed braces 122 and horizontal braces 127, 128 and 129 of which the braces 127 and 128 are shown extending each between a different one of the sloping rails or rafters 120 and a different one of the criss-crossed braces 122, whereas horizontal brace 129 is situated below the other cross braces 127 and 128 and is secured at its ends to the two criss-crossed braces. At the peak of the rafters 120 is a ridgepole 126 extending, in the instance of the master unit, from the rafters of the master frame at the right to the nearest or first frame of the chassis. Angle brackets 125 are shown interposed as a securing means between the peaks of the rafters and said ridgepole. The ridgepole for the next successive unit is shown attached similarly to the second frame of the chassis of the master unit and to the first or nearest frame of the chassis of the second unit.

As previously indicated in the description of the general assembly, the first or master unit has a single frame at the right side and a double frame or chassis at its left side, and is self supporting so it may be used without extraneous supports or braces. To this end, therefore, the first or master frame is provided with means as an inherent part thereof bracing said master frame in a sidewise direction, and the means depicted for that purpose herein is a vertically disposed ladder 500 the plane of which is perpendicular to the general side plane of the frame. The side of the ladder next the frame is welded or otherwise rigidly secured to the several sills and rails of the frame next to which it is located. Bracing at the other side of the master unit is accomplished by utilization of the double frame or chassis which includes two upright, parallel and spaced front posts 112 and correspondingly upright, parallel and spaced rear posts 112, each pair of front and rear posts having the previously described horizontal sills and frame members. Between the chassis frames are cross connections also constituting part of the chassis. As shown, cross braces or connections 110 are provided for corresponding horizontal frame members 113, 115 and 117 of the first frame of the chassis to the second frame of the chassis. The middle pair of horizontal frame members 115 likewise are shown connected and braced near what is here termed the front of the unit, by a horizontally disposed motor bed plate 109, and a similar motor bed plate is provided on another pair of said frame members, for instance on members 113 immediately below the first mentioned bed plate. Near an upper part of the chassis the side frames thereof are braced by a plurality of cross members or braces C (each having a different subtended numeral for specific reference thereto). As a further part of the chassis, the upper sill members 123 on the frames of each chassis are braced by fixed axles 250 secured to both said sills at both ends of the axles. These axles, as will later appear, carry power increasing pulleys rotatable thereon. Each succeeding chassis has a construction like that of the chassis of the master unit.

The ridgepole of each unit spans the space across the item being stored, and thus for the master unit braces the master frame and the first chassis, and for successive units braces between two successive chassis.

Each unit is provided with elevator platforms for each section above the base section. Details of construction of the elevator platforms may be observed by reference to Figures 6 to 14 inclusive showing each to be formed as a rectangular frame with side rails welded at their ends to end rails 202.

The platform side rails are preferably each fabricated from two lengths of angle-iron, that is, iron bars having an L-shaped cross-section. The two lengths are arranged so that the inner one has the horizontal flange 200 at the bottom edge and said flange extends inwardly of the platform from the vertical web, whereas the outer one of the two lengths has the horizontal flange 201 at the upper edge of the web and said flange extends outwardly of the platform. The vertical webs of the two lengths are riveted, welded or otherwise secured together for the truss strength afforded thereby and unifying the two lengths of angle iron as a single side rail. The inwardly directed flanges 201 of the side rails constitute supporting means for the ends of fire proofed floor boards 212 which are prevented from endwise displacement by engagement with the webs of said side rails.

The platform end rails 202 are preferably also lengths of angle-iron the horizontal flange of which is at the bottom of the vertical web and extends outward therefrom. This affords a stepped end to the platform of moderate depth up which an automobile wheel 600 will roll readily.

Paralleling the end rails and spaced inwardly therefrom is a pair of cross cleats each formed from three lengths of angle-iron 205, 206 and 205. The two angle-irons 205, 205 are approximately the same cross-sectional dimension as those employed as side and end rails and have the ends of their bottom flanges resting upon and secured to the bottom flanges 201 of the side rails. The vertical webs of the angle-irons of the cross cleats are spaced from each other an appropriate distance so as to receive thereon the longitudinal edges of a superposed length of angle-iron 206 resting in a diagonal position so that its flanges slope front and back and with the heel of the angle uppermost. This overlying or superposed length of diagonally positioned angle-iron accordingly extends across the platform and projects upward from the top surface of the floor and forms a fixed chock for the wheels 600 of an automobile driven onto the platform. A similarly positioned diagonal cross cleat 102 is provided as part of the base frame at ground level and when the lowermost platform is in its lowermost position the cross cleats of said platform, being hollow, nest over the cross cleats of the base frame.

Similarly, the second platform has hollow cross-cleats which nest over the cross-cleats of the first platform, and as shown comprise spaced angle-irons 225 crosswise of the platform and having a diagonal top angle iron 226 also projecting above the floor 212 of that platform to constitute wheel chocks. To assure nesting, the space between the cross-cleat angle-irons of the upper platform may be greater than the spacing of the corresponding angle-irons of the cleats for the lower platform. Furthermore, the diagonal top angle-irons in each instance are short enough to avoid the horizontal inwardly directed flanges of the side rails of the platform frames.

It should further be observed that the upper platform frame has side rails each composed of two lengths 220 and 221 of angle-iron assembled just the same as above described for the lower platform and with all platform side rails having equal lateral spacing so the platforms are of equal width. However, it is preferred that the end rails 222 of the upper platform shall be closer together than the corresponding end rails 202 of the lower platform so as to provide the stepped approach desired for the wheels 600 of the vehicle to climb when the platforms are nested in lowermost position.

Each platform is raised by operation of four cables attached near the corners of the platform. Apppropriate hangers for connection, such as shown in Figure 9, of the cable or wire-rope to the platform may be provided. The particular hanger here disclosed comprises a short length of angle-iron 203 for the lower platform having it horizontal flange uppermost and its vertical web outermost and depending from the flange. The horizontal web is butt-welded to the adjacent portion of the edge of the outwardly directed flange of the platform side rail and the box effect for keeping the hanger web from spreading is obtained by tension rods 208 welded next the lower edge of the said hanger web and at their other ends welded to the platform side rail web. A strong pin or rod 207 is butt-welded at one end to the web of the side rail and projects laterally therefrom outwardly through the hanger web and to which it is preferably welded. The projecting end of said pin receives an appropriate loop on the cable and by threading the end of the pin a nut may be applied thereto for keeping the cable loop from displacement.

Preferably the pin for the lifting cable of the upper platform does not project as far as the lower pin, and the hanger therefor is made with less width. In Figure 11, therefore, which shows the upper platform, the hanger provides a vertical web 223 only and no horizontal flange, the upper edge of the web being welded to the edge of the side rail of the platform and having a shorter pin 227 than previously described pin 207, projecting therefrom but otherwise alike in construction and mounting.

It seems appropriate to here call attention to the fact that the platforms are guided in their vertical travel, and this is accomplished by providing grooved rollers thereon which ride along the vertical posts 112 next adjacent the platforms. Consequently, as seen in Figures 17 and 18 more especially, said posts 112 are preferably channel-irons with flanges toward the platforms and providing free edges in directions such that the free edge of the front post flange faces rearward and that of the rear post faces forwardly and with the rollers between the facing edges. The roller hanger comprises a flat cleat 294 which can be bolted or riveted in place longitudinally of the outwardly directed flange 200 or 220 of the platform side rail. At a mid-part of said cleat is welded an angle-bracket 296 the vertical flange of which extends downward from the outer edge of the cleat. A roller shaft 298 projects through the said vertical flange and has its portion next the bracket welded thereto and has an outwardly projecting portion on which grooved roller 295 is rotatably carried. Outward displacement from and adjustment of the roller on the shaft is obtained by threading the end of the shaft and applying thereto appropriate lock nuts and washers or other thrust bearings 297.

Lifting of the upper platform is accomplished by cables or wire rope 351 at front and back of one side of the platform and cables or wire rope 352 at front and back of the other side of the platform. Both cables 351 wind in the same direction on one drum 238 at one side of the unit and both cables 352 for the other side of the platform wind in the same direction as the first two mentioned but on another drum 238 at the other side of the unit. Both drums are fast upon a driven shaft 232 near the peak of the rafter section and carried in appropriate bearings 242, 243. A second and similarly mounted driven shaft 232 is also carried by the rafter section and also equipped with winding drums thereon for receiving cables 353 and 354 to the opposite sides respectively and to the front and rear hangers of the lower platform.

An individual motor-driven winch connecting through power-increasing drums and appropriate cables is provided for operating each of said driven shafts. In both Figure 2 and Figure 3, two power shafts 275 are provided each mounted in bearing 281 individual thereto, one being carried from the cross-cleats of the chassis between rails 113 and the other on cross-cleats between rails 115. Preferably the lower power shaft is for operating the lower elevator platform and the upper one for operating the upper elevator platform. Each shaft has a winch 278 fixed thereon to rotate with the shaft.

A cable 359 is shown wound on the lower winch and extending to and wound on the larger portion of power-increasing drum 265 rotatable on a shaft 250 for the purpose. Said drum 265 has a smaller portion on which a cable 357 winds and extends to and winds on the larger portion of a second power-increasing drum 255 on another shaft 250. From the smaller portion of this second power-increasing drum 255 a cable 355 extends to a driven drum 235, winding on both. Said driven drum 235 is fast on the afore-mentioned driven shaft 232 having the elevating drums 238 connecting by cables 353, 354 to the lower platform.

Similarly a cable 360 is shown wound on upper winch 278 and extending to and wound on the larger portion of power-increasing drum 265 rotatable on a shaft 250 for the purpose. This said drum 265 has a smaller portion on which a cable 358 winds and extends to and winds on the larger portion of another power-increasing drum 255 on another shaft 250. From the smaller portion of this last-mentioned power-increasing drum 255 a cable 356 extends to a driven drum 235 winding on both. This last mentioned driven drum 235 is fast on driven shaft 232 having the elevating drums 238 connecting by cables 351, 352 to the upper platform.

Figure 2:
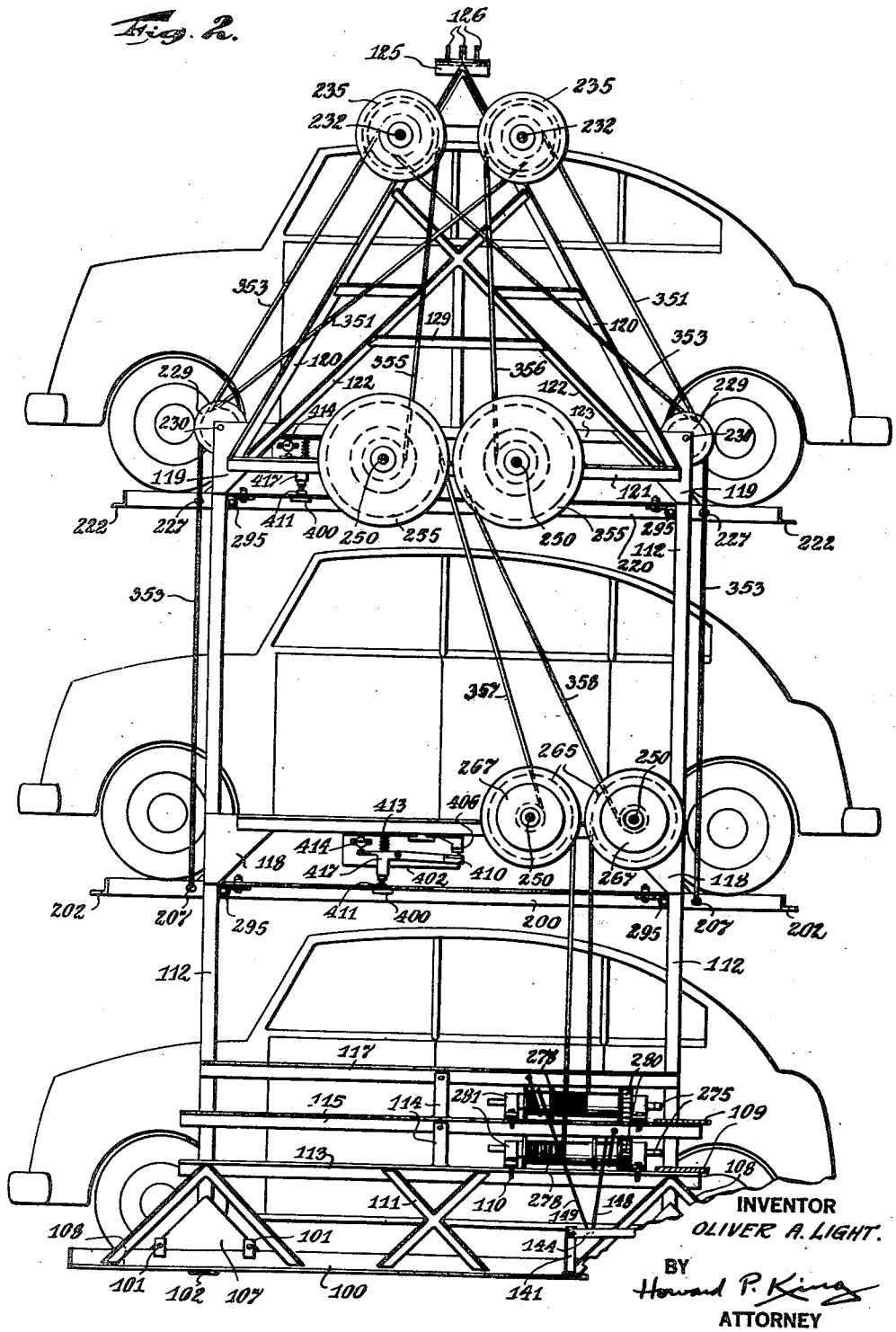
Figure 2 is a side elevation of one of the rack sections and taken as a sectional view on a vertical plane between any two rack sections as shown in Figure 1.
Figure 3:
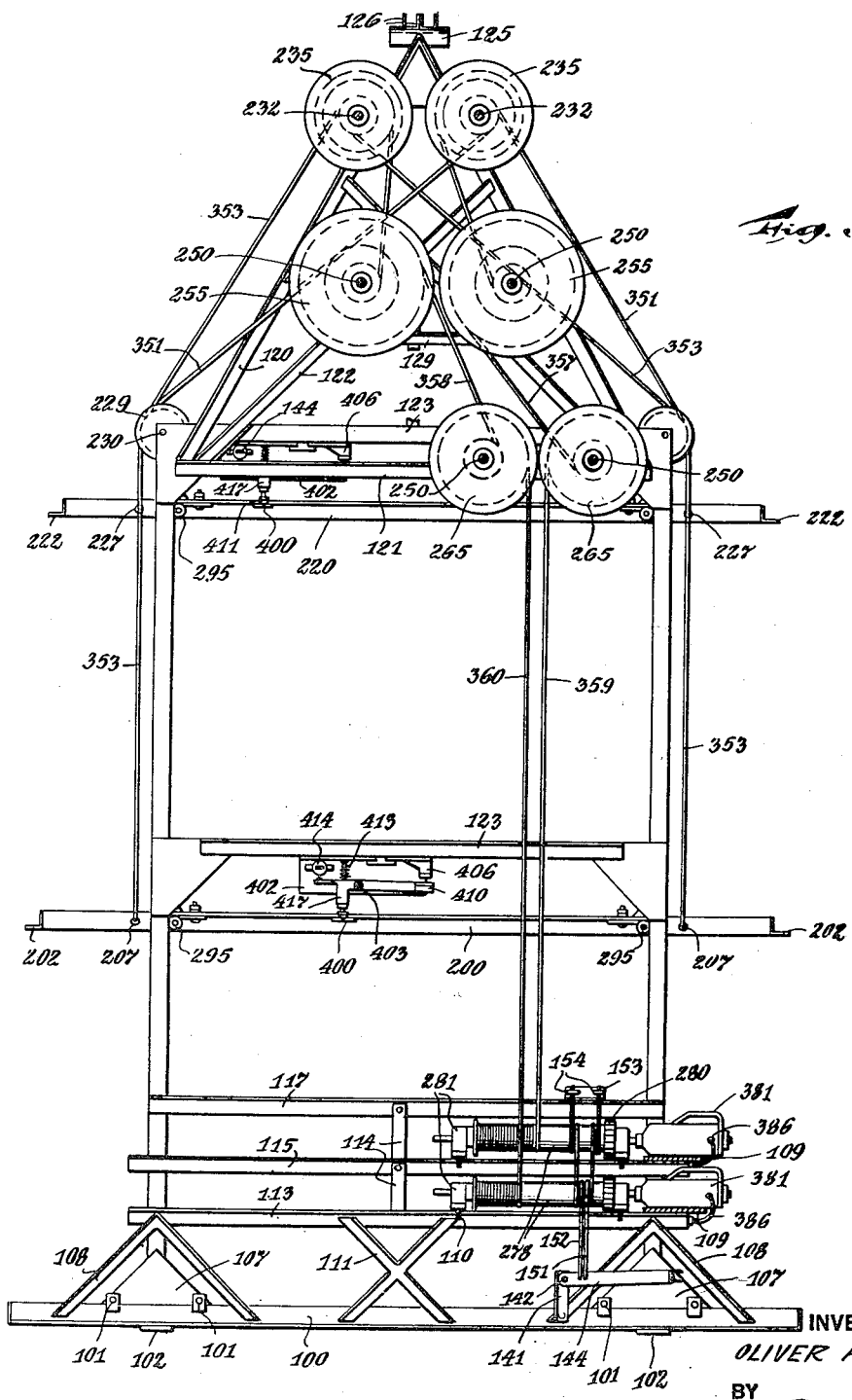
Figure 3 is a side elevation of one of the units of Fig. 1, modified in the showing of power-increasing drums at the top rafter section of a rack unit and showing two portable motors in position and two platforms nesting one on the other and at an uppermost position.
Figure 4:
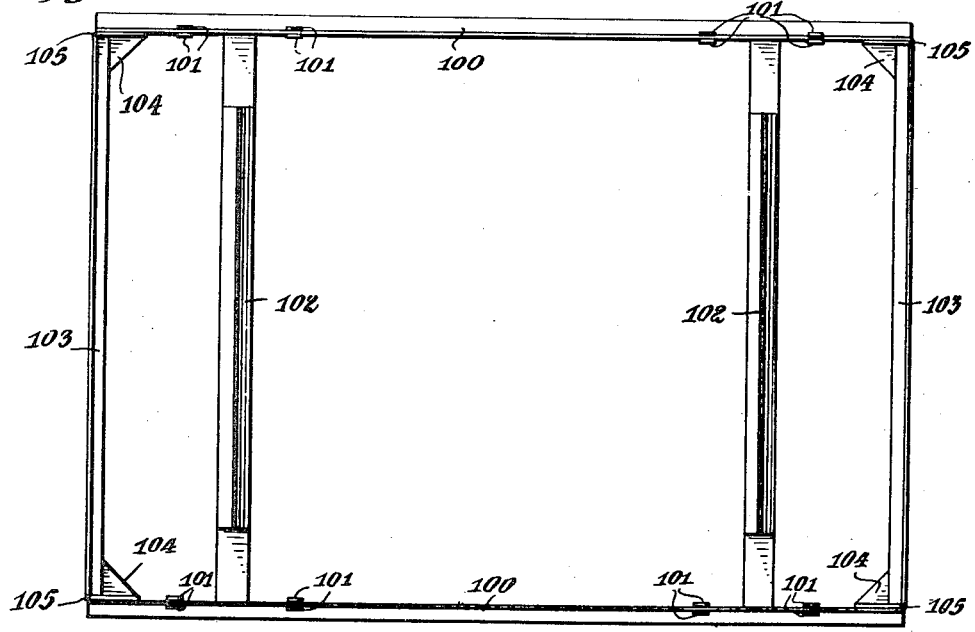
Figure 4 is a plan of the base sills or frame.
Figure 5:
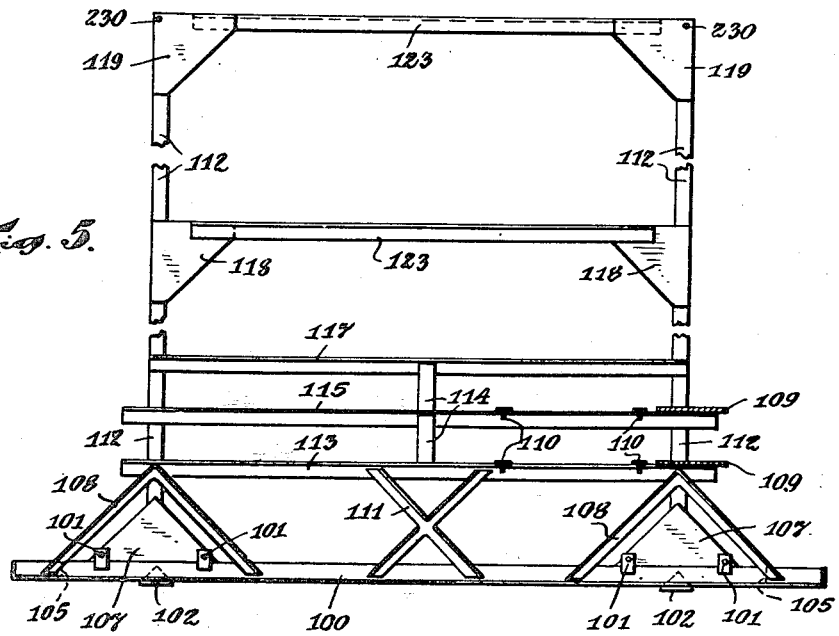
Figure 5 is a side elevation of the base of Fig. 4 and showing part of the superposed frame.

In Figure 2 one pair of power-increasing drums 265 are shown carried at the intermediate section by mounting shafts 250 thereof from the intermediate rails 123, and the other pair of power-increasing drums are shown carried by the rafter section by mounting shafts 250 from the lower rafter rails 121. In Figure 3, the same system of cables and drums is present, but the two pairs of power-increasing drums are both mounted on the rafter section. In both Figures 2 and 3, portable motors 381 are applicable to the driving shaft. As shown in Figure 41, the motor has a socket attachment 385 applicable to said shaft 275 and has a handle 384 for carrying and moving the motor. The motor foot 140 is slidable in and removable from tracks 139 on a bed plate 109 and the motor can be secured as by padlock 383 in its appointed place. Plug-in connection 386 for supplying electric power to the motor is provided at a convenient place.

Figures 2 and 3 differ with respect to the brake by which downward movement of the platforms are controlled. The brake arrangement of Figure 2 is more fully illustrated in Figures 37 and 40. Each winch provides a part of its length as a snubbing drum. A snubbing cable 148 for the lower winch and snubbing cable 149 for the upper winch each have their upper end fixed and their lower ends attached to brake levers or treadles 146, 147 respectively. These treadles are spring-actuated to keep the snubbing cables normally loose, but either cable may be made tight by pressing on the appropriate treadle. The cable will then snub the drum and retard its rotation.

Figure 39:
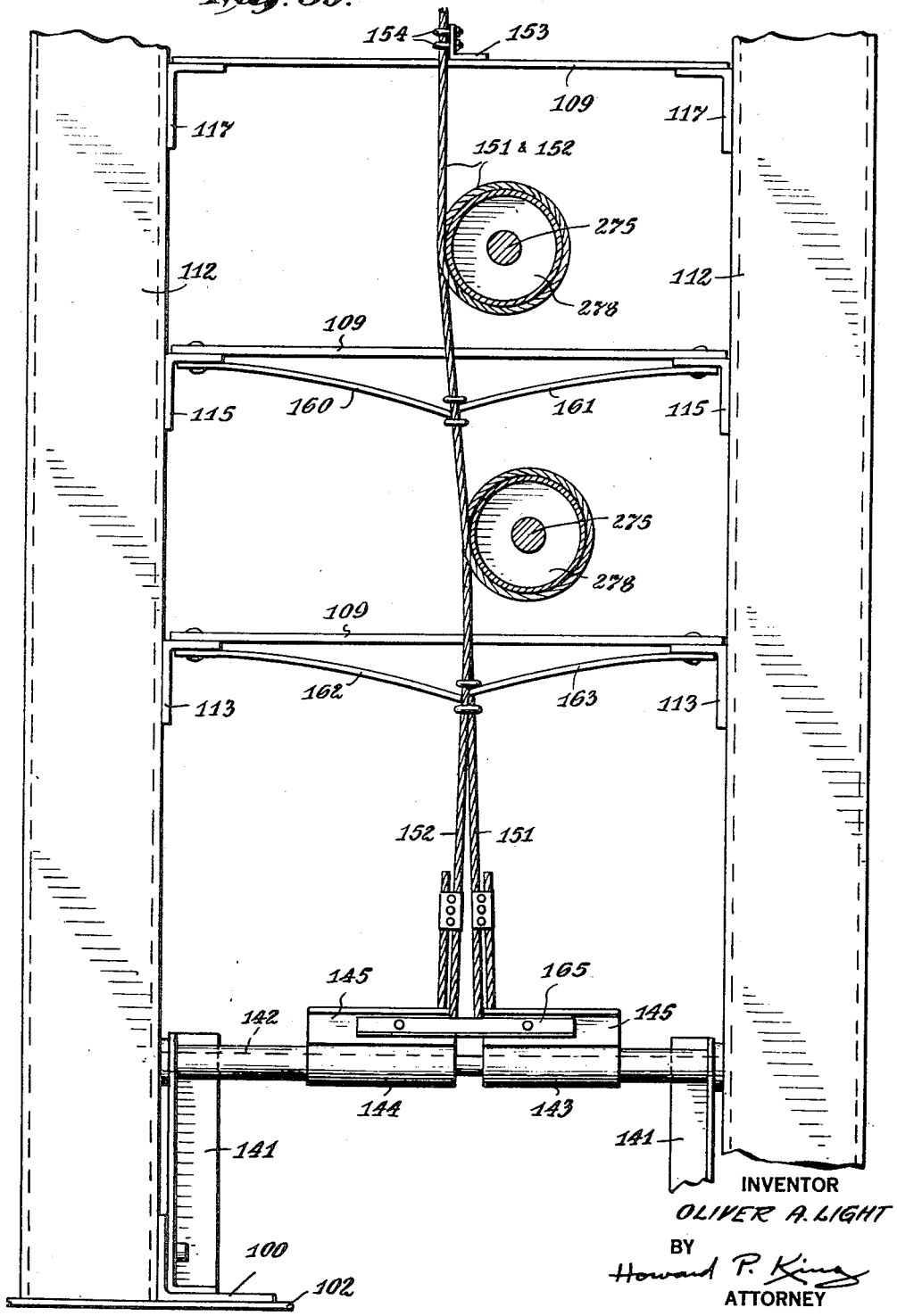
Figure 39 is an end sectional elevation of Fig. 38.

The brake arrangement of Figure 3 is more fully illustrated in Figures 38 and 39. In that showing, which is the preferred form, there are as before two treadles 143, 145 each having a snubbing cable 151, 152 respectively attached thereto. Both cables in this showing first wind about the lower drum 278 and then both wind about the upper drum. The upper ends of the snubbing cables are made fast by suitable staples or shackles 154 carried by a fixed block 153. If so desired, both treadles may be secured together as shown by cleat 165 in Figure 39. Likewise in Figure 39 said treadles are shown fulcrumed at 142 in fixed bars 141 for the purpose, and cable clamps 155 are shown for securing the ends of the cables. Springs 160—163 shown as leaf springs with frictional engagement with the snubbing cables, constitute means for keeping the cables normally loose with respect to the drums.

Locking of the driving drums 278 against unauthorized use is illustrated particularly in Figure 40, each said drum having a ratchet wheel 280 fast thereon. A pawl 288 is provided for the ratchet wheel on the upper drum and a pawl 289 is provided for the ratchet wheel on the lower drum. A keeper bracket 382 is located adjacent each pawl and is provided with two holes so that a padlock 383 may be applied through one hole and the pawl to lock the pawl in engagement with the ratchet, or may be applied through the other hole and the pawl to lock the pawl out of engagement. If the pawl is not desired to be locked in either hole, the lock may be kept handy by hanging it from a handle 287.

As shown in Figures 19 to 23 inclusive, it is desirable and preferable to provide a pawl and ratchet retention of the driven shaft from rotation in lowering direction except when specifically released by the operator. In these views, a ratchet wheel 241 is secured on the driven shaft 232. The attachment may be conveniently obtained by bolts or rivets 245 through the said ratchet wheel and an adjacent drum 238 which is fast on the shaft. Pawls 246 pivotally supported at 131 from the rafter section are engageable with the ratchet teeth of the respective ratchets on the two shafts 232 except when positively lifted by lines 361 or 362 shown connected thereto and each riding over a pulley 247 rotatably carried on axle 130. The lower end of the line or pull-cord 361 in the one instance or 362 for the other ratchet may be seen in Figure 40 as coming to a position convenient to the operator and may be held in pulled condition by catching on hooks 389 or 390.

Compound leverage for operating the pawls is provided in the showing of Figure 23. Pawls 365, 367 there shown have both gravity and spring actuation to engaging position. As before, said pawls are pivoted at 369, and with as long a lever as possible between the pivot and the pawl lip. Behind the pivot the pawl has a head 371 as part thereof and movable therewith. Forwardly of the pivot is provided a stop 372 to limit the amplitude of lift of the pawl. Beneath pawl 365 is a lever 366 and beneath pawl 367 is a similar lever 368 each pivoted well forward with respect to the length of the pawl and having a short forward nose which will engage and lift the pawl when the lever is swung. The rear end of the lever behind its pivot 370 is long compared to the nose and is normally held up by a spring 363 for pawl lever 368 and spring 364 for pawl lever 366. The said rear ends of the levers are respectively engaged by the pull cords 361 and 362 described above. Since there is long leverage from cord attachment to the pivot and short leverage from the pivot to the nose of each lever, lifting power on the pawl is thereby increased. The said head at the rear of the pawl is engaged by the operating lever responding to its spring loading, and thereby utilizes the spring to return the pawl to ratchet-engaging position.

Figure 15:
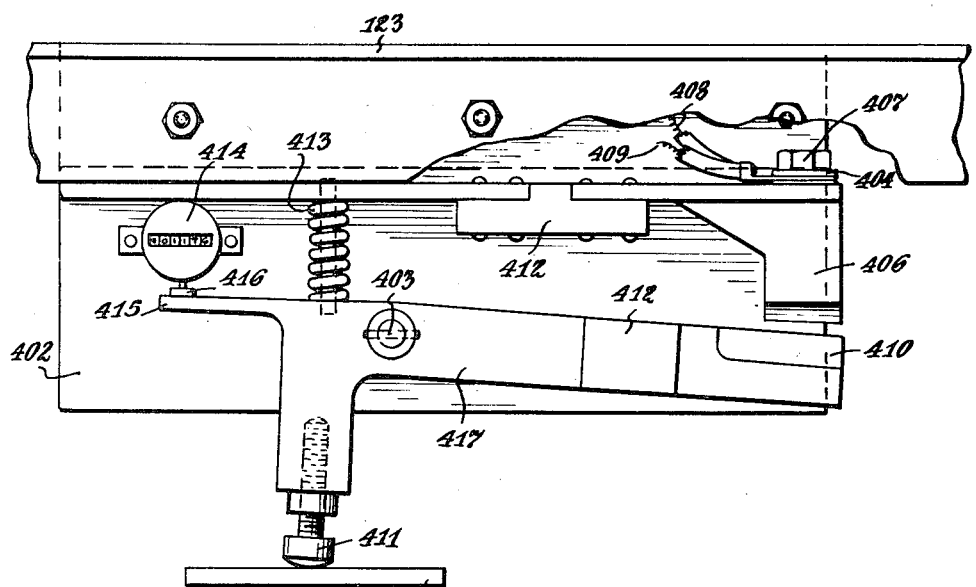
Figure 15 is a side elevation of a circuit breaker and trip register.
Figure 16:
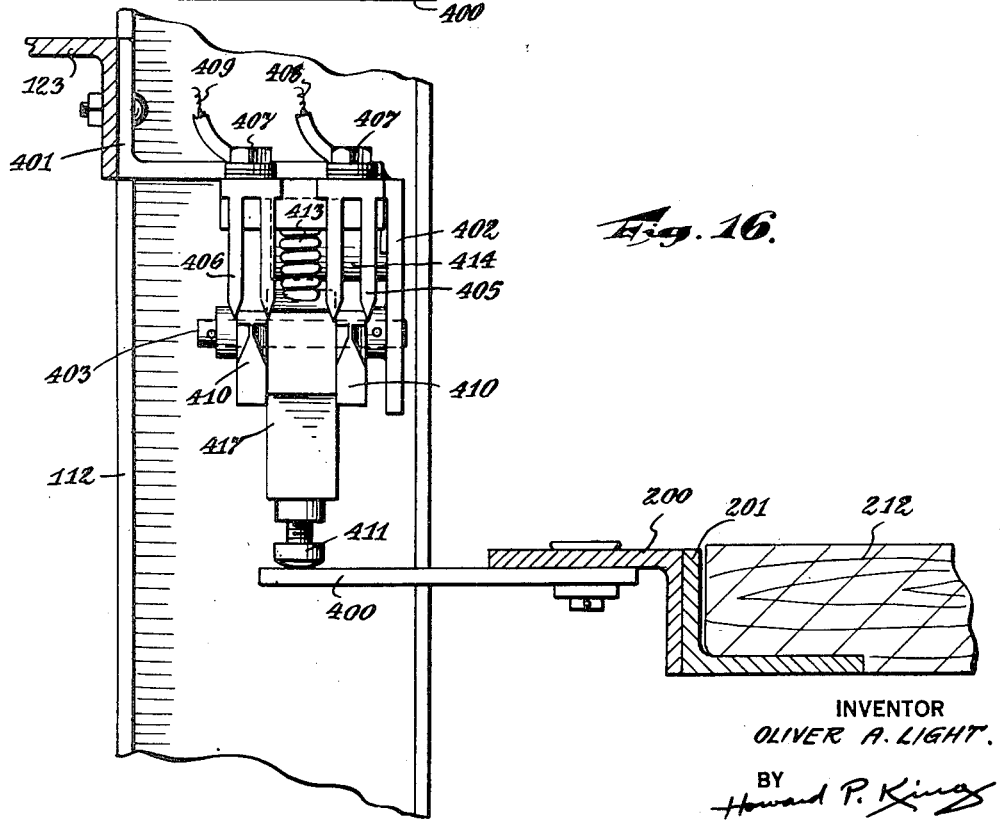
Figure 16 is an elevation of the circuit breaker and showing a portion of one platform and showing a removable trigger about to be operated at a predetermined position of the platform.

Means are provided for automatically breaking the electric circuit to the motor when the elevator platform has attained its desired lifted position, the same being indicated in place in Figure 2 and shown in greater detail in Figures 15 and 16. A bell crank 417 is pivoted by pivot 403 on a bracket 401 in turn mounted on rail 123. One arm shown extending nearly horizontal from the pivot has a bifurcated outer end shaped and constituting two switch blades 410 but electrically connected to each other. Between the pivotal mounting 403 and said bifurcated outer end, suitable insulation 412 is interposed so that no electric current is present in the main or pivoted portion of the lever. Above the lever is a fixed bracket 402 also having insulation 412 to electrically isolate a pair of double switch fingers 405 and 406, each pair being connected by a ring 404 and screw 407 to a different section of the series line 408, 409 to the motor. When fingers 405, 406 are contacted by knife blades 410, the series connection to the motor is completed. Said lever 417 is spring-loaded by a spring 413 to normally close the switch. Opening of the switch may be obtained by an arm 400 horizontally pivoted on a bracket on the platform frame. Said arm is located to engage and swing the depending arm of the bell crank lever 417 when the platform reaches the proper elevation. Precision of switch opening to synchronize with ratchet position or for other purposes may be obtained by providing an adjustable screw 411 protruding from the bottom of the bell crank lever where engaged by the arm of the platform. The bell crank lever is also shown as having an arm engageable each time the switch is opened, against the operating button 416 of a counter 414. For elevating a heavy body, such as a truck, it may be desirable to use both motors, and the two platforms can be kept nested as they are elevated as shown in Figure 3. In event of such operation, the lower platform may be permitted to pass its normal stopping position by swinging the stop arm 400 out of line with the switch lever.

The drums employed may be economically constructed as indicated in Figure 30, by shaping cylindrical cedar wood patterns as 266 and 270 substantially the desired size of the body of the drum. Hub-lining 251 is inserted through the large pattern 266 and then the sides or flanges 265 are applied, these being secured in place by rivets 257 at the periphery of the pattern. The said sides or flanges are brazed or welded to the hub-lining. Then the smaller pattern 270 is applied on the hub-lining 251 and an end flange 267 applied at the outer end thereof. Long rivets 258 extend through the several sides or flanges and the two patterns and hold the same assembled after which the last-applied flange is brazed or welded to the hub-lining. Finally strips are wrapped around the peripheries of the wood patterns, said strips thereby becoming cylindrical and retained as cylinders by welding or brazing the ends and by welding or brazing the edges to the said flanges.

To accommodate slight discrepancies in location of the rails of adjacent units which mount opposite ends of shafts 250, it is preferable to fabricate the shafts and their attachment with a latitude of movement. Figures 31–36 illustrate my improved construction. Near each end of the shaft the same is machined with an annular hollow around the periphery. A U-shaped or shackle bolt 249 seats in said hollow holding the shaft toward the rail through which the bolt passes. Between the legs of the bolt and engaging in the said hollow of the bolt is a pillow 248 which has a rounded contact with the shaft permitting the said shaft to swing with a universal motion as required and yet obtaining a high degree of rigidity lengthwise of the shaft for bracing purposes.

I claim:

1. A storage rack comprising a self-sustaining master unit and an adjacent unit thereto, each of said units having a four-post chassis at corresponding sides thereof, said adjacent unit being attached to and having support at its side toward the master unit wholly from the chassis of the said master unit.

2. A storage rack comprising a self-sustaining master unit and an adjacent unit thereto, each of said units having a four-post chassis at corresponding sides thereof, said adjacent unit being attached to and having support at its side toward the master unit from the chassis of the said master unit, and each unit having an elevator platform therein, and platform operating mechanism in the chassis of each unit for operating the platform of that unit.

3. A storage rack comprising a self-sustaining master unit and an adjacent unit thereto, each of said units having a four-post chassis at corresponding sides thereof, said adjacent unit being attached to the chassis of the master unit for support thereby, and each of said units having a plurality of elevator platforms therein, and platform operating mechanisms in the chassis of each unit operatively connected with the said plurality of platforms of that unit.

4. A storage rack comprising a self-sustaining master unit having a master frame at one side and a four-post chassis at the other side, and a plurality of successive units at the side next the said chassis of the master unit, each said successive unit having a four-post chassis at the side thereof furthest from the master unit, and each successive unit being attached to and having support at its side toward the master unit from the chassis of the next preceding unit.

5. A storage rack comprising a self-sustaining master unit having a master frame at one side and a four-post chassis at the other side, and a plurality of successive units at the side next the said chassis of the master unit, each said successive unit having a four-post chassis at the side thereof furthest from the master unit, and each successive unit being attached to and having support at its side toward the master unit from the chassis of the next preceding unit, and platforms and platform-operating mechanism for each of said units and each said platform and its operating mechanism being confined entirely within the width of the unit having that platform.

6. A storage rack comprising a self-sustaining master unit having a four-post chassis at one side thereof, horizontal rails between front and back pairs of posts of said chassis, and shafts bracing between pairs of said rails, said shafts having universal attachment to said rails by which said shafts adjust themselves to approximately perpendicular position to said rails and at the same time are retained in secure bracing relation to said rails by said universal attachment thereto.

7. A storage rack comprising a master unit having a master frame at one side and a four-post chassis at the other side, said master frame having means at the outside of said unit bracing said frame laterally, and said chassis having means within the confines thereof bracing said chassis, whereby said master unit is self-sustaining, and said unit having means therein for supporting a plurality of items to be stored by said unit at successive elevations.

8. A storage rack comprising a master unit having a master frame at one side and a four-post chassis at the other side, a rigid ladder at the outside of and rigidly secured edgewise to said master frame bracing said frame laterally, and said chassis having means within the confines thereof bracing said chassis, whereby said master unit is self-sustaining, and said unit having means therein for supporting a plurality of items to be stored by said unit at successive elevations.

9. A storage rack comprising a supporting unit, elevator platforms in said unit, one of said platforms being in its entirety above a lower one thereof and both of said platforms being movable up and down in said unit, and the upper one of said platforms being shorter than said lower one thereby providing a stepped approach for a vehicle to the upper one of said platforms across the end of said lower one of said platforms.

10. A storage rack comprising a supporting unit, elevator platforms in said unit, one of said platforms being above a lower one thereof and both of said platforms being movable up and down in said unit and adapted to be juxtaposed one upon the other, said platforms each having fixed chocks projecting from the upper surfaces thereof, the chocks of the upper platform being hollow, and the chocks of the lower platform nesting in the hollow chocks of the upper platform in juxtaposed position of said platforms.

11. A storage rack comprising a supporting unit having chocks cross-wise thereof at its bottom, elevator platforms in said unit above said chocks, the platform next above said chocks of the bottom having hollow chocks adapted to nest over the bottom chocks with said platform lowered to the bottom of said unit.

12. A storage rack comprising a supporting unit having chocks cross-wise thereof at its bottom, upper and lower elevator platforms in said unit movable up and down therein and adapted to be juxtaposed one on the other, said platforms each having fixed hollow chocks superposed above said chocks at the bottom of the unit, and said chocks of the platforms adapted to nest with respect to each other and to said chocks at the bottom of the unit with said platforms in lowermost position.

13. A storage rack comprising a supporting unit, an elevator platform in said unit movable up and down therein, means for elevating said platform, a driven shaft in said unit above said platform and operable by said elevating means, drums on said shaft, cables from said drums to the platform supporting said platform from said drums, a pawl and ratchet for retaining said drums from backward rotation, a pull cord for releasing said pawl from the ratchet, and a power-increasing lever interposed between the pull cord and the pawl.

14. A storage rack comprising a supporting unit, a plurality of elevator platforms in said unit, a like plurality of winches located one above the other in said unit, cables individual to each winch for lifting a different one of said platforms by each winch, and a plurality of snubbing cables common to the plurality of winches for controlling the lowering of any and all of said platforms.

15. A storage rack in accordance with claim 14 wherein means are provided for retaining the snubbing cables normally relaxed with respect to the winches.

OLIVER A. LIGHT.

REFERENCES CITED

The following references are of record in the file of this patent:

UNITED STATES PATENTS

| Number | Name | Date |
|---|---|---|
| 296,856 | Livingston | Apr. 15, 1884 |
| 643,922 | Trexler | Feb. 20, 1900 |
| 1,210,444 | Fallek | Jan. 2, 1917 |
| 1,565,559 | Gillen | Dec. 15, 1925 |
| 1,673,864 | Chapman | June 19, 1928 |
| 1,918,116 | Mansfield | July 11, 1933 |
| 2,224,529 | Thompson et al. | Dec. 10, 1940 |
| 2,242,891 | Light | May 20, 2941 |
| 2,242,892 | Light | May 20, 1941 |
| 2,379,446 | Krueger | July 3, 1945 |

FOREIGN PATENTS

| Number | Country | Date |
|---|---|---|
| 441,280 | Great Britain | Jan. 16, 1936 |